US012776574B2

(12) United States Patent
Kim et al.

(10) Patent No.: US 12,776,574 B2
(45) Date of Patent: Oct. 27, 2026

(54) RF MODULE FOR ANTENNA, RF MODULE ASSEMBLY, AND ANTENNA APPARATUS INCLUDING SAME

(71) Applicant: KMW INC., Hwaseong-si (KR)

(72) Inventors: Duk Yong Kim, Yongin-si (KR); Young Chan Moon, Suwon-si (KR); Joon Hyong Shim, Yongin-si (KR); Sung Hwan So, Hwaseong-si (KR); Bae Mook Jeong, Suwon-si (KR); Min Seon Yun, Anyang-si (KR); Kyo Sung Ji, Hwaseong-si (KR); Chi Back Ryu, Hwaseong-si (KR); Sung Ho Jang, Hwaseong-si (KR); Jae Hong Kim, Yongin-si (KR); Oh Seog Choi, Hwaseong-si (KR); Yong Won Seo, Daejeon (KR)

(73) Assignee: KMW INC., Hwaseong-si (KR)

( * ) Notice: Subject to any disclaimer, the term of this patent is extended or adjusted under 35 U.S.C. 154(b) by 309 days.

(21) Appl. No.: 18/138,078

(22) Filed: Apr. 23, 2023

(65) Prior Publication Data

US 2023/0282978 A1 Sep. 7, 2023

Related U.S. Application Data

(63) Continuation of application No. PCT/KR2021/014997, filed on Oct. 25, 2021.

(30) Foreign Application Priority Data

Oct. 27, 2020 (KR) ........................ 10-2020-0139847
Oct. 22, 2021 (KR) ........................ 10-2021-0141814

(51) Int. Cl.
*H01Q 3/44* (2006.01)
*H01Q 1/24* (2006.01)

(52) U.S. Cl.
CPC ............... *H01Q 3/44* (2013.01); *H01Q 1/246* (2013.01)

(58) Field of Classification Search
CPC ............ H01Q 1/42; H01Q 3/44; H01Q 1/246; H01Q 19/104; H01Q 15/14;
(Continued)

(56) References Cited

U.S. PATENT DOCUMENTS 5,796,367 A * 8/1998 Andersson ............... H01Q 1/02 343/846
7,588,074 B1 * 9/2009 White ..................... F28F 3/083 257/722
(Continued)

FOREIGN PATENT DOCUMENTS

CN 107851879 A 3/2018
CN 110574227 A 12/2019
(Continued)

OTHER PUBLICATIONS

European Search Report dated Nov. 28, 2024 for Application No. 21886722.4-1201.

(Continued)

*Primary Examiner* — Dimary S Lopez Cruz
*Assistant Examiner* — Anna N Hamadyk

(57) ABSTRACT

An antenna RF module includes an RF filter arranged on a front surface of a main board, a radiation element module arranged on a first side of the RF filter, and a reflector arranged between the RF filter and the radiation element module in such a manner as to ground (GND) the radiation element module and, at the same time, to serve as an intermediary for dissipating heat generated in the RF filter to the outside. Accordingly, a radome that interrupts dissipation of heat to in front of an antenna is unnecessary, and heat (Continued)

generated from heat generating elements of the antenna apparatus is spatially separated.

14 Claims, 30 Drawing Sheets

(58) Field of Classification Search
CPC .. H01Q 21/0006; H01Q 21/0025; H01Q 1/02; H01P 1/20309
See application file for complete search history.

(56) References Cited

U.S. PATENT DOCUMENTS

| | | | | |
|---|---|---|---|---|
| 12,244,053 | B2 * | 3/2025 | Kim | H01Q 21/0025 |
| 2004/0201543 | A1 | 10/2004 | Gottl et al. | |
| 2013/0222201 | A1 | 8/2013 | Ma et al. | |
| 2015/0250022 | A1 * | 9/2015 | Kim | H05K 7/20545 455/561 |
| 2017/0104277 | A1 * | 4/2017 | Viscarra | H01Q 1/526 |
| 2018/0219277 | A1 * | 8/2018 | Hirata | H01Q 1/02 |
| 2018/0358710 | A1 | 12/2018 | Toyao et al. | |
| 2019/0006262 | A1 * | 1/2019 | Lewin | H05K 7/20418 |
| 2019/0081443 | A1 * | 3/2019 | So | H01R 43/20 |
| 2019/0268046 | A1 * | 8/2019 | Kim | H01Q 21/065 |
| 2019/0312339 | A1 * | 10/2019 | Fritze | H04W 24/00 |
| 2020/0021005 | A1 * | 1/2020 | Kosaka | H01Q 1/42 |
| 2020/0244018 | A1 * | 7/2020 | Park | H01R 13/2421 |
| 2022/0294108 | A1 * | 9/2022 | Zhang | H01Q 1/246 |

FOREIGN PATENT DOCUMENTS

| | | | |
|---|---|---|---|
| EP | 4235969 | A | 8/2023 |
| JP | 2013-219723 | A | 10/2013 |
| JP | 2019-536359 | A | 12/2019 |
| KR | 10-2006-0008312 | A | 1/2006 |
| KR | 10-1808592 | B1 | 12/2017 |
| KR | 10-1855133 | B1 | 5/2018 |
| KR | 10-2019-0025025 | A | 3/2019 |
| WO | 2018/168699 | A1 | 9/2018 |

OTHER PUBLICATIONS

Non-final Office Action dated Jul. 2, 2024 for Japanese Application No. 2023-524869.

International Search Report mailed Jan. 28, 2022 for International Application No. PCT/KR2021/014997 and its English translation.

Chinese Office Action mailed on Apr. 2, 2026 from State Intellectual Property Office for Chinese Application No. 202180073291.5.

* cited by examiner (a) (b)

(a) (b)

RF MODULE FOR ANTENNA, RF MODULE ASSEMBLY, AND ANTENNA APPARATUS INCLUDING SAME

CROSS-REFERENCE TO RELATED APPLICATIONS

This application is a continuation application of International Application No. PCT/KR2021/014997, filed Oct. 25, 2021, which claims the benefit of Korean Patent Application Nos. 10-2020-0139847, filed Oct. 27, 2020; and 10-2021-0141814, filed Oct. 22, 2021, in the Korean Intellectual Property Office, the disclosures of which are incorporated herein in their entirety by reference.

TECHNICAL FIELD

The present disclosure relates to an antenna RF module, an RF module assembly including the antenna RF modules, and an antenna apparatus including the RF module assembly. More particularly, the preset disclosure relates to an antenna RF module in which a radome of an antenna apparatus in the related art is unnecessary and in which a radiation element module and an RF element are arranged in such a manner to be exposed to outside air in front of an antenna housing, thereby improving performance in heat dissipation, an RF module assembly including the antenna RF modules, and an antenna apparatus including the RF module assembly. It is possible to manufacture the antenna RF module, the RF module assembly, and the antenna apparatus in a manner that slims down them and to reduce the cost of manufacturing them.

BACKGROUND ART

An antenna of a base station, such as a relay station, that is used in a mobile communication system has various shapes and structures. Normally, the antenna has a structure in which a multiplicity of radiation elements are suitably arranged on at least one reflection plate that stands upright in a lengthwise direction thereof.

In recent years, research has been actively conducted in order to satisfy requirements for high performance of an antenna based on Multiple Input Multiple Output (MIMO), and at the same time to achieve a miniaturized, lightweight, and low-cost structure. Particularly, in a case where a patch-type radiation element that realizes linear polarization or circular polarization is used in an antenna apparatus, normally, a technique is widely used in which the radiation element made of a dielectric substrate of a plastic or ceramic material is plated and is combined with a printed circuit board (PCB) by soldering.

FIG. 1 is an exploded perspective view illustrating an example of an antenna apparatus 1 in the related art.

In the antenna apparatus 1, as illustrated in FIG. 1, a multiplicity of radiation elements 35 are arranged to be exposed toward a direction of a front surface of an antenna housing main body 10 that corresponds to a beam output direction, in such a manner that a beam is output in a desired direction and that beamforming is facilitated, and a radome 50 is mounted on a front end portion of the antenna housing main body 10 with the multiplicity of radiation elements 35 in between, in order to provide protection from an outside environment.

More specifically, the antenna apparatus 1 in the related art includes the antenna housing main body 10 having the form of a rectangular parallelepiped-shaped casing with a small thickness that is open at the front surface thereof and that has a multiplicity of heat dissipation pins 11 integrally formed on the rear surface thereof, a main board 20 arranged in a stacked manner on a rear surface of the antenna housing main body 10 inside the antenna housing main body 10, and an antenna board 30 arranged in a stacked manner on a front surface of the antenna housing main body 10 inside the antenna housing main body 10.

A patch-type radiation element or dipole-type radiation elements 35 may be mounted in a front surface of the antenna board 30, and a radome 50 that protects components inside the antenna housing main body 10 from the outside and facilitates radiation from the radiation elements 35 may be installed on a front surface of the antenna housing main body 10.

However, in an example of the antenna apparatus 1 in the related art, a front portion of the antenna housing main body 10 is closed by the radome 50. For this reason, the radome 50 itself serves as an obstacle that interrupts dissipation of heat of the antenna apparatus 1 toward a front direction. Furthermore, the radiation elements 35 are also designed in such a manner as to perform only transmission and reception of an RF signal. Thus, heat generated in the radiation elements 35 cannot be discharged to the front direction. For this reason, heat generated in an element generating much heat inside the antenna housing main body 10 has to be uniformly discharged to in back of the antenna housing main body 10. Thus, there occurs a problem in that performance in heat dissipation is greatly decreased. In order to solve this problem, there is an increasing demand for a new design for heat dissipation structure.

In addition, in the example of the antenna apparatus 1 in the related art, the volume of the radome 50 and the volume occupied by an arrangement structure in which the radiation element 35 is spaced away from the front surface of the antenna board 30 create a situation where it is very difficult to implement a base station with reduced size that needs to be installed in a building or a 5G shadowing area.

SUMMARY OF INVENTION

Technical Problem

An object of the present disclosure, which is contrived to solve the above-mentioned problem, is to provide an antenna RF module in which a radome is omitted and in which an antenna RF module is arranged outside an antenna housing in such a manner as to be exposed to outside air, thereby possibly dissipating heat in a distributed manner toward front and rear directions of the antenna housing and greatly improving performance in heat dissipation, an RF module assembly including the antenna RF modules, and an antenna apparatus including the RF module assembly.

Another object of the present disclosure is to provide an antenna RF module that has a reflector inside that stably protects an RF filter, performs a grounding function between a radiation element and the RF filter, and easily dissipates heat generated from the direction of the RF filter, to the outside and, at the same time, grounds (GND) the radiation element, an RF module assembly including the antenna RF modules, and an antenna apparatus including the RF module assembly.

Still another object of the present disclosure is to provide an antenna RF module that is capable of improving ease of assembling thereof to a main board by integrally forming a reflector to be provided between a radiation element and an RF filter on a unit RF filer on a per-RF-module basis, an antenna RF module assembly including the antenna modules, and an antenna apparatus including the antenna RF module assembly.

The present disclosure is not limited to the above-mentioned objects. From the following description, other objects not mentioned would be understandable by a person of ordinary skill in the art to which the present disclosure pertains.

Solution to Problem

According to an aspect of the present disclosure, there is provided an antenna RF module including: an RF filter arranged on a front surface of a main board; a radiation element module arranged on a first side of the RF filter, and a reflector integrally formed on the RF filter and arranged between the RF filter and the radiation element module in such a manner as to ground (GND) the radiation element module and, at the same time, to serve as an intermediary for dissipating heat generated in the RF filter to the outside.

In the antenna RF module, the RF filter and the reflector may be manufactured into one piece of a metal material for molding using a die-casting molding technique.

In the antenna RF module, the reflector may include a blocking rib formed on a front surface of the RF filter in a manner that protrudes toward a front direction so that an edge end portion, other than a front surface, of the radiation element module is accommodated in the block rib.

In the antenna RF module, the reflector may further a multiplicity of grill pins formed in a manner that protrudes outward from an end portion of the blocking rib, and some of the multiplicity of grill pins may be formed to extend in such a manner as to overlap a multiplicity of grill pins, respectively, of a reflector adjacent in a leftward-rightward direction.

In the antenna RF module, the reflector may further include a multiplicity of grill pins formed in such a manner as to protrude outward from an end portion of the blocking rib, and some of the multiplicity of grill pins may be formed to extend in an upward-downward direction in a straight line with a multiplicity of grill pins, respectively, of a reflector adjacent in the upward-downward direction.

In the antenna RF module, in a case where the radiation element module is arranged to be spaced a gap of half a wavelength from a radiator element module adjacent, a separation distance between each of the multiplicity of grill pins may be set to have 1/10 to 1/20 of a gap between each of the radiation element modules.

In the antenna RF module, a seating end portion in which an edge end portion of the radiation element module is seated may be formed, in the form of a groove, in an internal surface of the blocking rib of the reflector.

The antenna RF module may further include an amplification unit board arranged in any one of predetermined spaces formed in a first side and a second side, respectively, in a width direction of a filter body of the RF filter, and electrically connected to the main board by being combined therewith in a socket-pin coupling manner.

In the antenna RF module, the RF filter may include a filter heat sink panel dissipating heat generated from the amplification unit board from the space to outside the filter body.

In the antenna RF module, the filter heat sink panel may close the open space in the filter body and, at the same time and may be brought into surface contact with the amplification unit board for heat transfer so that the heat generated from the amplification unit board is dissipated through filter heat sink pins integrally formed on an external surface of the filter heat sink panel.

In the antenna RF module, at least one male socket that is combined, in a socket-pin coupling manner, with the main board, may be provided on the amplification unit board.

In the antenna RF module, at least one of a PA element and an LNA element may be mounted, as an analog amplification element, on the amplification unit board.

In the antenna RF module, the filter body and the radiation element module may be electrically connected to each other with at least one first coaxial connector in between.

In the antenna RF module, the at least one first coaxial connector may be provided on an antenna arrangement unit that is formed on a front surface of the filter body in such a manner that the radiation element module is seated on the antenna arrangement unit.

In the antenna RF module, a multiplicity of resonators in the space in the filter body, a multiplicity of cavities being formed in the space, and the amplification unit board may be electrically connected to each other with at least one second coaxial connector in between.

In the antenna RF module, the at least one second coaxial connector may be provided in the predetermined space that is formed in a lateral portion of the filter body in such a manner that the amplification unit board is arranged in the predetermined space.

According to another aspect of the present disclosure, there is provided an antenna RF module assembly including: a multiplicity of RF filters arranged on a front surface of a main body in an upward-downward direction and a leftward-rightward direction; a multiplicity of radiation element modules arranged on first sides, respectively, of the multiplicity of RF filters; and a reflector integrally formed on each of the multiplicity of RF filters and arranged between each of the multiplicity of RF filters and each of the multiplicity of radiation element modules in such a manner as to ground (GND) each of the multiplicity of radiation element modules and, at the same time, to serve as an intermediary for dissipating heat generated in the multiplicity of RF filters to the outside.

According to still another aspect of the present disclosure, there is provided an antenna apparatus including: a main board, at least one digital element being mounted on a front or rear surface of the main board; a rear housing formed in the form of casing in a manner that is open at the front end, so that the main board is installed in the rear housing; and an RF module assembly connected to the main board through an electrical signal line, wherein the RF module assembly includes: a multiplicity of RF filters arranged on a front surface of a main body in an upward-downward direction and a leftward-rightward direction; a multiplicity of radiation element modules arranged on first sides, respectively, of the multiplicity of RF filters; and a reflector integrally formed on each of the multiplicity of RF filters and arranged between each of the multiplicity of RF filters and each of the multiplicity of radiation element modules in such a manner as to ground (GND) each of the multiplicity of radiation element modules and, at the same time, to serve as an intermediary for dissipating heat generated in the multiplicity of RF filters to the outside.

Advantageous Effects of Invention

An antenna RF module, an RF module assembly including the antenna RF modules, and an antenna apparatus including the antenna RF module according to first, second, and third embodiments, respectively, of the present disclosure can achieve various effects that follow.

Firstly, heat generated from heat generating elements of the antenna apparatus is spatially separated. Thus, it is possible that the heat is dissipated in a distributed manner toward a forward-backward direction of the antenna apparatus. Accordingly, the effect of greatly improving performance in heat dissipation can be achieved.

Secondly, a radome that interrupts dissipation of heat to in front of an antenna is unnecessary. Accordingly, the effect of greatly reducing a product manufacturing cost can be achieved.

Thirdly, RF-related amplification elements that are mounted to the side of a main board in the related art, along with an RF module, constitute a RF module, and are arranged outside an antenna housing. Accordingly, the effect of greatly improving the overall performance in heat dissipation in the antenna apparatus can be achieved.

Fourthly, the RF-related amplification elements are separated from the main board, and thus the number of layers of the man board that is a multi-layer board is greatly reduced. Accordingly, the advantage of reducing the cost of manufacturing the main board can be achieved.

Fifthly, it is possible that RF components having frequency dependence are configured as the RF module and the RF module is configured to be detachably attachable to an antenna housing. Thus, in a case where an individual RF component constituting the antenna apparatus is defective or damaged, only the individual antenna RF module is replaced. Accordingly, the advantage of making maintenance of the antenna apparatus facilitated can be achieved.

Sixthly, it is possible that heat is dissipated in a distributed manner in the antenna apparatus. Therefore, the length and volume of a heat sink (a heat dissipation pin) integrally formed on a rear surface of the antenna housing can be reduced. The effect of facilitating an overall product design for thinning can be achieved.

Seventhly, it is possible that heat is dissipated through a radiation director, in a radiation element module, that performs a function of radiating an electromagnetic wave. Accordingly, the effect of maximizing a heat-dissipation area of a front surface of the antenna apparatus can be achieved.

The present disclosure is not limited to the above-mentioned effects. From the following description, other effects not mentioned would be understandable by a person of ordinary skill in the art to which the present disclosure pertains.

DESCRIPTION OF THE REFERENCE NUMERALS IN THE DRAWINGS

Figure 1:
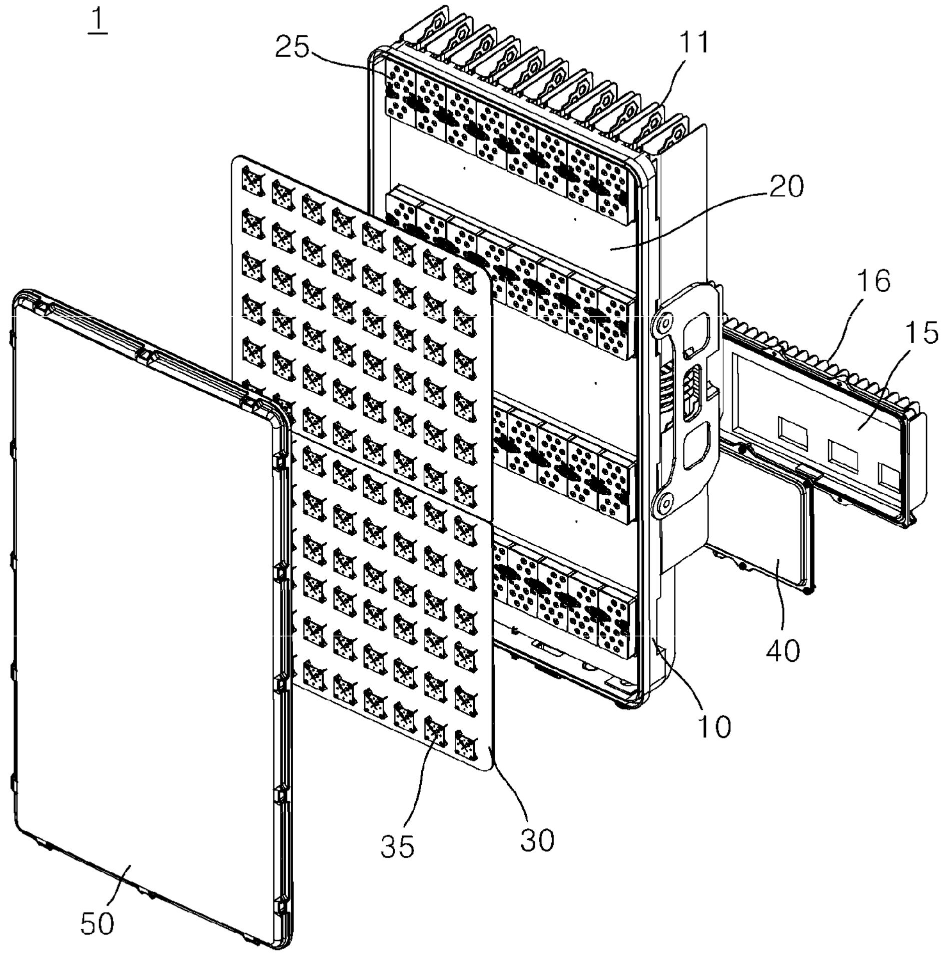
FIG. 1 is an exploded perspective view illustrating an example of an antenna apparatus in the related art.

100: Antenna Apparatus 105: Antenna Housing
110: Rear Housing 111S: Internal Space

111: Rear Heat Dissipation Pin 120: Main Board
125: Female Socket **128*a***: First Heat Generating Element
**128*b*: Second Heat Generating Element 130**: Front Housing
140: RF Filter 141: Filter Body
**142*a*: Screw Through-hole 143**: Separation Wall
146: Amplification Unit Board 146': Male Socket **146*a*-1, 146*a*-2: PA Element 146*c***: LNA Element
147: Fixation Boss 148: Heat Sink Panel
**149*a*: Screw Fixation Hole 149*b***: Screw Through-hole
150: Reflector 151: Antenna Arrangement Unit
155: Multiplicity of Heat Dissipation Holes 157: Boss Through-hole
160: Radiation Element Module 161: Radiation Element Module Cover
162: Printed Circuit Board 162-1, 162-2: Contact Unit **163*a*: Antenna Patch Circuit Unit 163*b***: Electricity Supply Line
165: Radiation Director 166: Reinforcement Rib
167: Director Fixation Unit 168: Director Fixation Protrusion
200: RF Module 300: RF Module Assembly
500: Outside Mounting Member

DESCRIPTION OF EMBODIMENTS

An antenna RF module, an RF module assembly including the antenna RF modules, and an antenna apparatus including the RF module assembly according to first, second, third embodiments, respectively, of the present disclosure, will be described in detail below with reference to the accompanying drawings.

It should be noted that, in assigning a reference numeral to a constituent element that is illustrated in the drawings, the same constituent element, although illustrated in different drawings, is designated by the same reference numeral, if possible, throughout the drawings. In addition, specific descriptions of a well-known configuration and function associated with the first, second, and third embodiments of the present disclosure will be omitted when determined as making the embodiments of the present disclosure difficult to understand.

The ordinal numbers first, second, and so forth, the letters A, B, and so forth, the parenthesized letters (a), (b), and so forth may be used to describe constituent elements of the first, second, third embodiments of the present disclosure. These ordinal numbers, letters, parenthesized letters are only used to distinguish among constituent elements and do not impose any limitation to the natures of constituent elements to which these ordinal numbers, letters, or parenthesized letters, respectively, are assigned, the turn of each of the constituent elements to operate or function, the order of the constituent elements, and the like. Unless otherwise defined, all terms including technical or scientific terms, which are used in the present specification, have the same meanings as are normally understood by a person of ordinary skill in the art to which the present disclosure pertains. A term as defined in a dictionary in general use should be construed as having the same meaning as interpreted in context in the relevant technology, and, unless otherwise explicitly defined in the present specification, should not be construed as having an ideal meaning or an excessively-formal meaning.

According to the present disclosure, there is no need to essentially provide a radome of an antenna apparatus in the related art, and RF-related amplification elements mounted on a main board inside an antenna housing, along with a RF filter, are configured as an RF module. The technical idea of the present disclosure is that heat generated from various heat generating elements of the antenna apparatus is spatially separated. The antenna RF module, the RF module assembly including the antenna RF modules and the antenna apparatus including the RF module assembly according to the first, second, and third embodiments, respectively, of the present disclosure will be described below with reference to the drawings.

Figure 2:
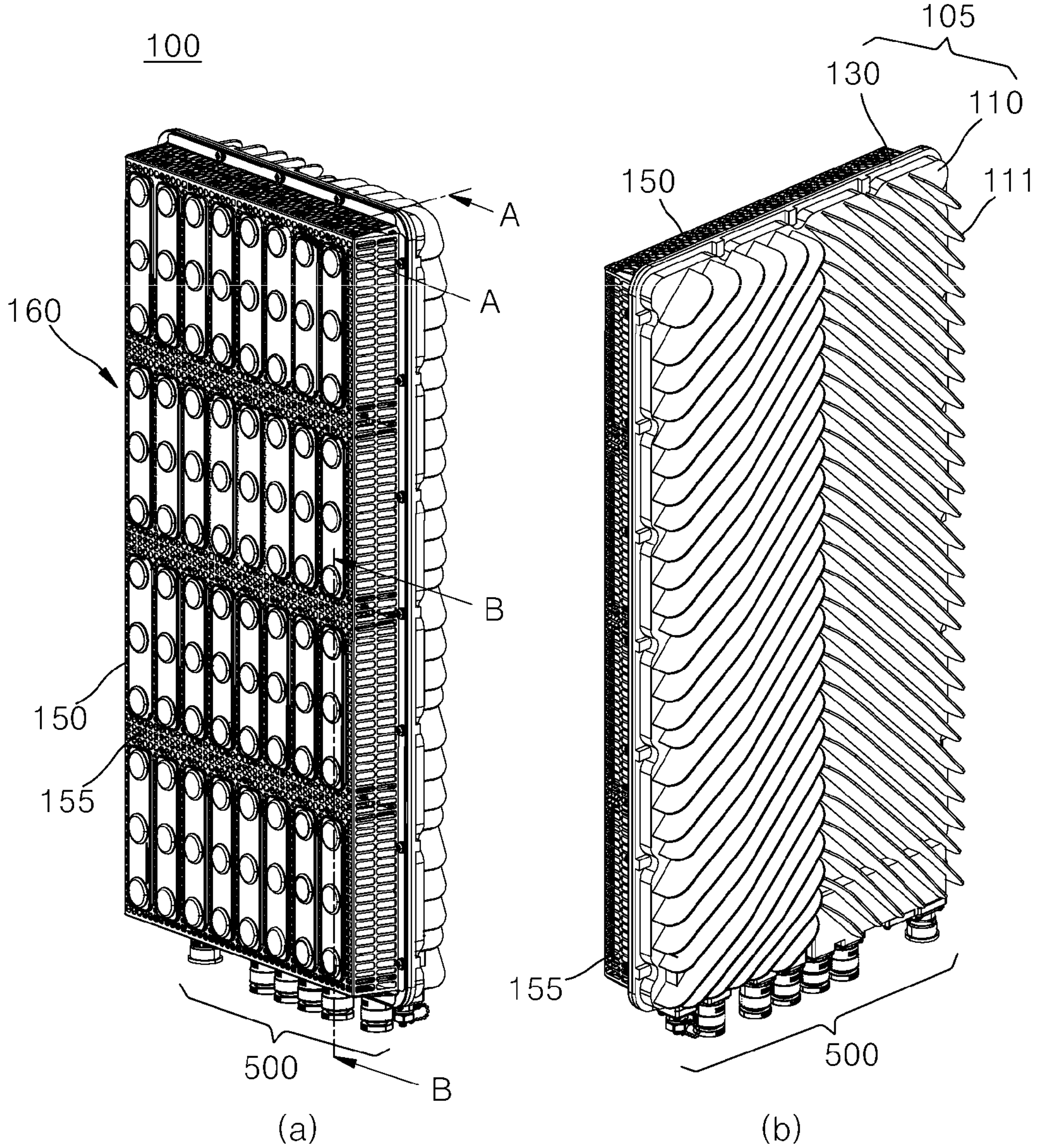
FIG. 2 is perspective views illustrating front and rear portions, respectively, of the antenna apparatus according to a third embodiment of the present disclosure.
Figure 3A:
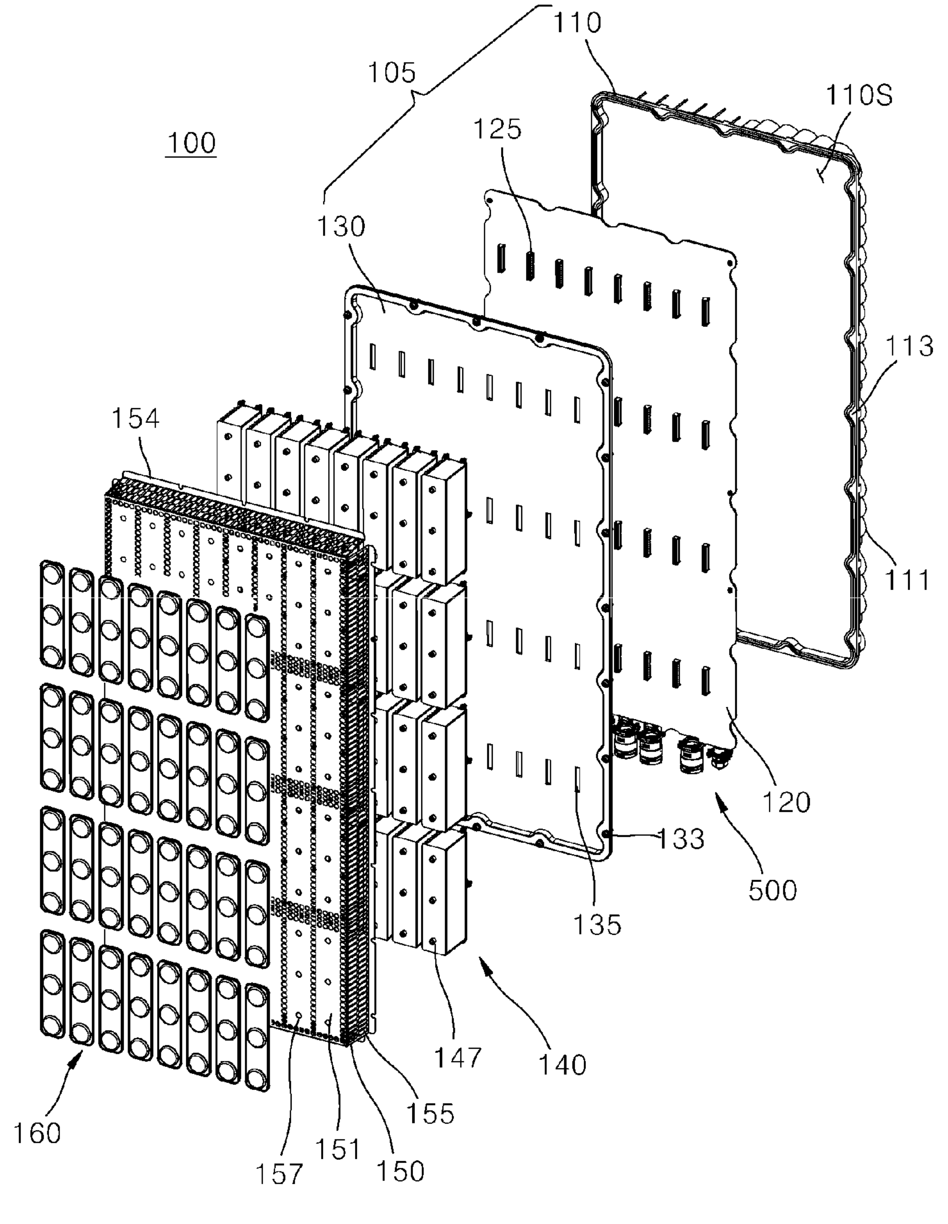
FIGS. 3*a* and 3*b* are exploded perspective views illustrating the front and rear portions of the antenna apparatus in FIG. 2.
Figure 3B:
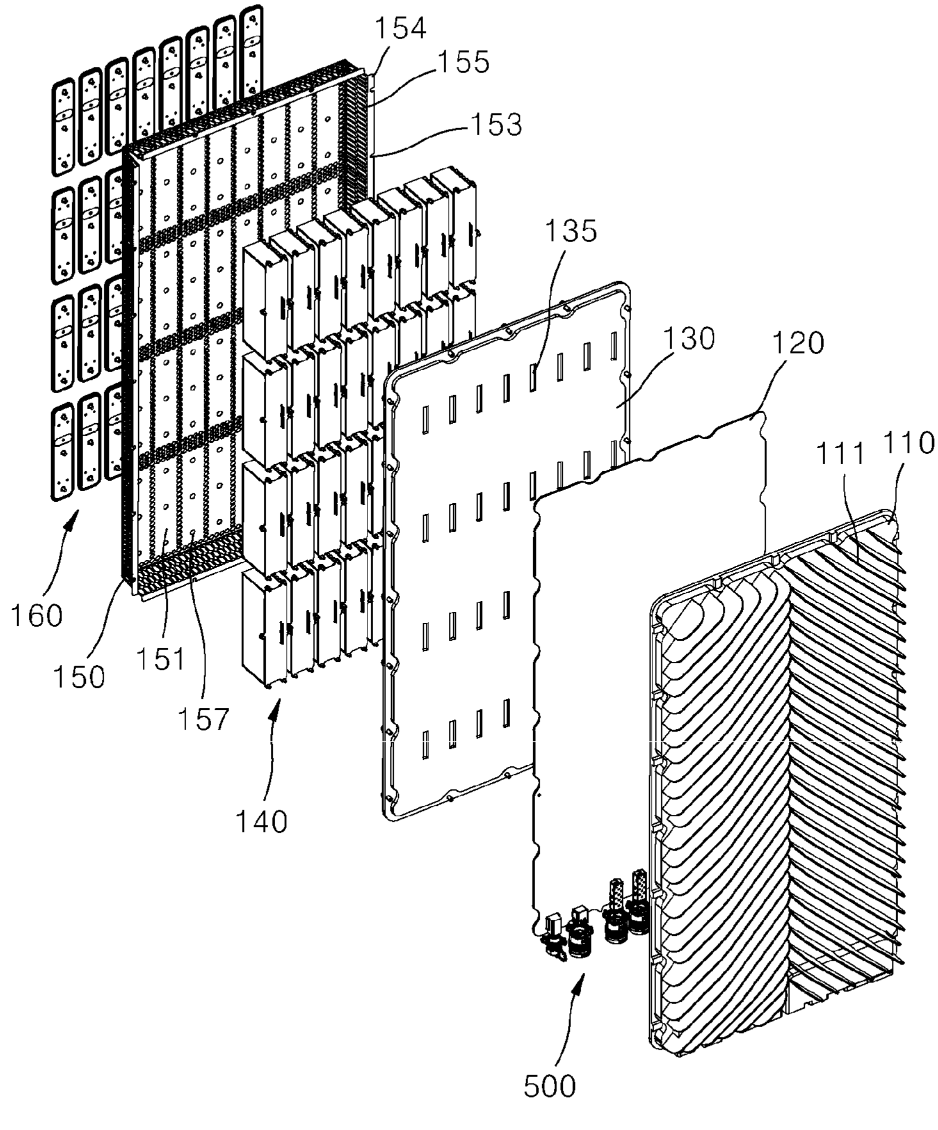
Figure 4:
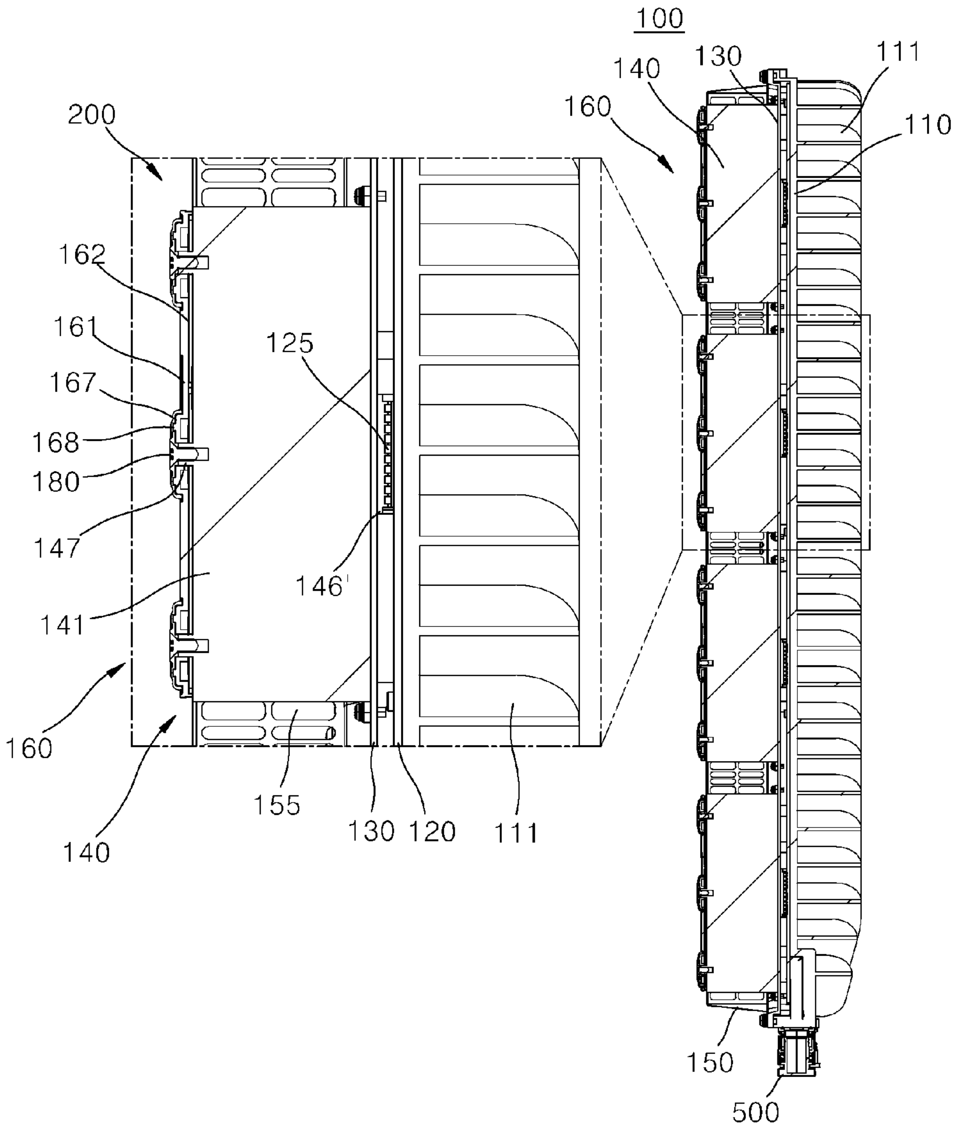
FIG. 4 is a cross-sectional view taken along line A-A on FIG. 2 and an enlarged view illustrating a portion of the cross-sectional view.
Figure 5:
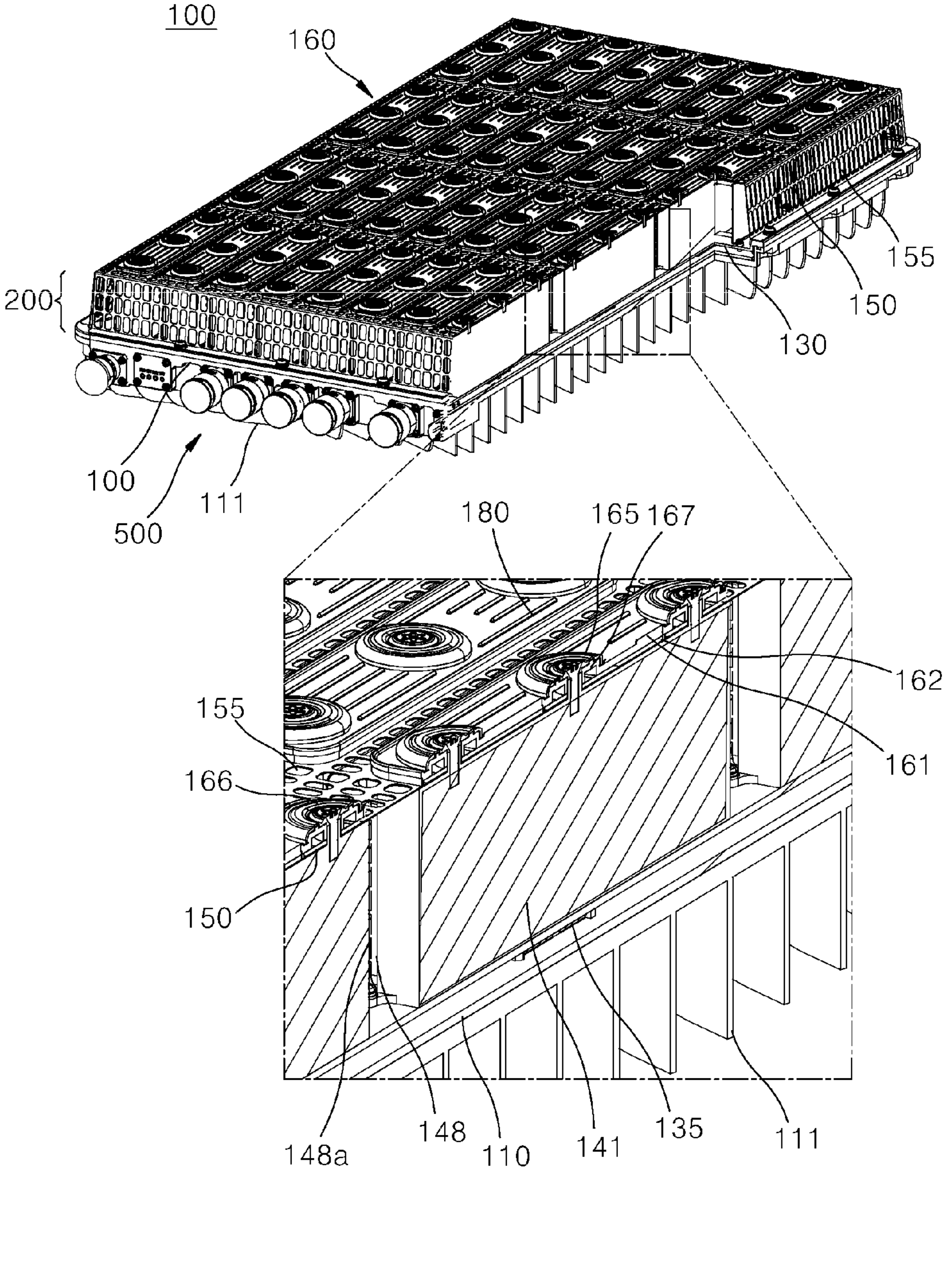
FIG. 5 is a cut-away perspective view taken along line B-B on FIG. 2 and an enlarged view illustrating a portion of the cut-away perspective view.
Figure 6:
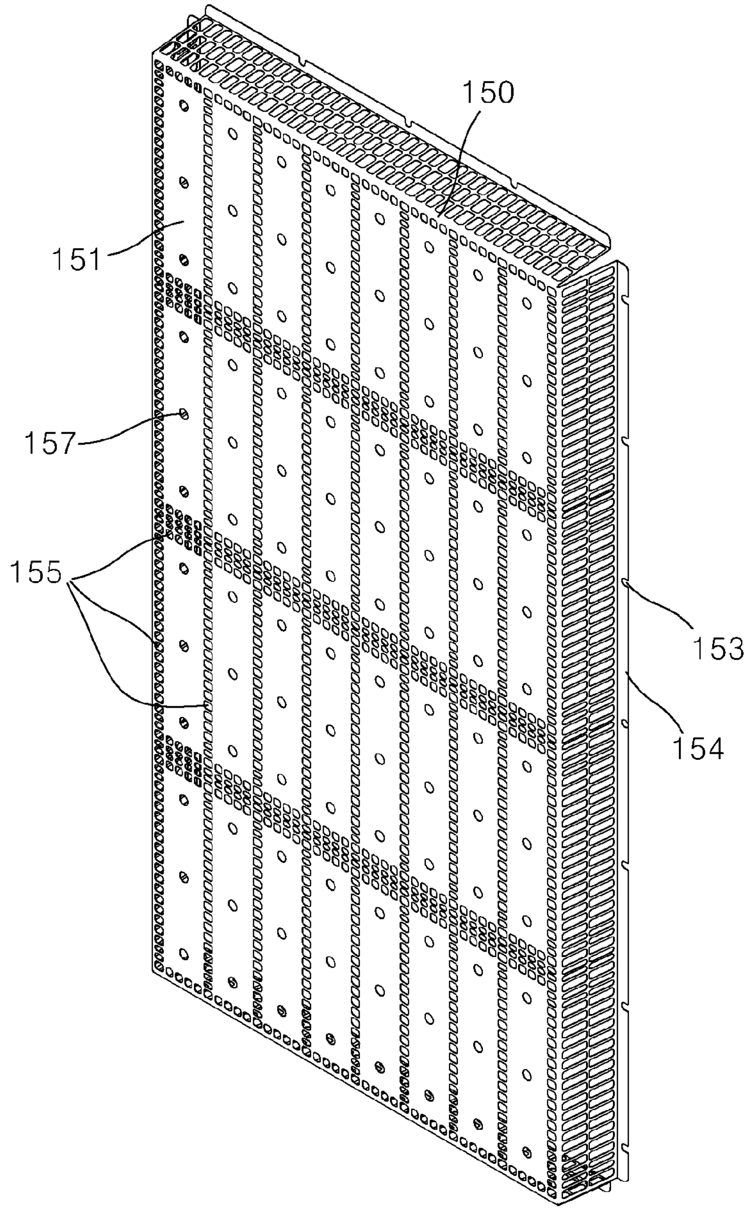
FIG. 6 is a perspective view illustrating a reflector, one of constituent elements in FIG. 2.

FIG. **2*a* is a perspective view illustrating a front portion of the antenna apparatus according to the third embodiment of the present disclosure. FIG. 2*b* is a perspective view illustrating a rear portion of the antenna apparatus according to the third embodiment of the present disclosure. FIG. 3*a* is an exploded perspective view illustrating the front portion of the antenna apparatus in FIG. 2. FIG. 3*b* is an exploded perspective view illustrating the rear portion of the antenna apparatus in FIG. 2. FIG. 4 is a cross-sectional view taken along line A-A on FIG. 2 and an enlarged view illustrating a portion of the cross-sectional view. FIG. 5 is a cut-away perspective view taken along line B-B on FIG. 2 and an enlarged view illustrating a portion of the cut-away perspective view. FIG. 6 is a perspective view illustrating a reflector, one of constituent elements in FIG. 2**.

An antenna apparatus 100 according to the third embodiment, as illustrated in FIGS. 2 to 5, includes an antenna housing 105 that forms the exterior appearance of the antenna apparatus 100. The antenna housing 105 includes a rear housing 110 that forms the exterior appearance of the antenna apparatus 100 when viewed from rear and a front housing 130 that forms the exterior appearance of the antenna apparatus 100 when viewed from front.

Furthermore, the antenna apparatus 100 according to the third embodiment of the present disclosure further includes a main board 120 installed in a contacted manner in an internal space 110S in the antenna housing 105, and an antenna radio frequency module (RF frequency module) 200 (referred to as the "RF module") stacked on a front surface of the front housing 130.

The antenna housing 105 is combined with the RF module 200. Thus, the antenna housing 105 forms the exterior appearance of the entire antenna apparatus 100 and may serve as an intermediary for combination with a support pole that, although not illustrated, is provided to install the antenna apparatus 100. However, as long as there is no restriction on space for installation of the antenna apparatus 100, the antenna housing 105 is not necessarily combined with the support pole. It is also possible that the antenna housing 105 is directly installed, in a wall-mounted manner, on or fixed to a vertical structure, such as an inside or outside wall of a building. Particularly, it is significantly meaningful that the antenna apparatus 100 according to the third embodiment of the present disclosure is designed for thinning in such a manner as to have a minimized thickness in the forward-backward direction in order to be easily installed in a wall-mounted manner. The installation of the antenna apparatus 100 in a wall-mounted manner will be described in detail below.

The antenna housing 105 is made of a metal material having an excellent heat transfer property in such a manner as to advantageously dissipate heat through an overall area thereof by heat transfer. Moreover, the antenna housing 105 is formed in the form of a rectangular parallelepiped-shaped casing with a small thickness in the forward-backward direction, and the rear housing 110 is formed to be open at the front surface thereof. Thus, the antenna housing 105 has a predetermined internal space 110S. Although not illustrated in the drawings, the antenna housing 105 serves as an intermediary for installation of the main board 120 on which a digital element (for example, a field programmable gate array (FPGA), a power supply unit (PSU), and/or the like) is mounted.

Although not illustrated in the drawings, the rear housing 110 may be formed in such a manner that an internal surface thereof shape-fits on an externally protruding portion of the digital element (the FPGA or the like), the PSU, and/or the like that is mounted in a rear surface of the main board 120. The reason for this is to increase an area, for heat transfer, of the inside surface of the rear housing 110 that is brought into contact with a rear surface of the main body 120 and thus to maximize performance in heat dissipating.

Although not illustrated in the drawings, a handle may be further installed on both the left and right sides of the antenna housing 105. An operator on the spot uses the handle when transporting the antenna apparatus 100 according to the third embodiment of the present disclosure or in order to facilitate manual mounting of the antenna apparatus 100 on the support pole (not illustrated) or the inside or outside wall of the building.

Moreover, various outside mounting members 500 for connecting a cable to a base station not illustrated and for regulating an internal component may be assembled to the outside of a lower end portion of the antenna housing 105 by passing therethrough.

With reference to FIG. 2, a multiplicity of rear heat dissipation pins 111 may be integrally formed with a rear surface of the rear housing 110 in such manner as to have a predetermined pattern. In this case, heat generated from the main board 120 installed in the internal space 110S in the rear housing 110 may be directly dissipated toward the rear direction through the multiplicity of rear heat dissipation pins 111.

The multiplicity of rear heat dissipation pins 111 are arranged in such a manner that the rear heat dissipation pins 111 on the left side of the rear surface of the rear housing 110 are inclined upward toward the right side thereof and that the rear heat dissipation pins 111 on the right side of the rear surface of the rear housing 110 are inclined upward toward the left side thereof (refer to FIG. 2*b*). The multiplicity of rear heat dissipation pins 111 may be designed in such a manner that the heat dissipated toward the rear of the rear housing 110 dispersedly forms ascending air currents toward the leftward and rightward direction, respectively, of the rear housing 110 and thus is dispersed more quickly. However, the multiplicity of rear heat dissipation pins 111 are not necessarily limited to formation in this arrangement. For example, although not illustrated in the drawings, in a case where a forced-draft fan module (not illustrated) is provided to the side of the rear surface of the rear housing 110, a configuration may be employed in which the multiplicity of rear heat dissipation pins 111 are parallelly formed on the left and right sides of the rear surface thereof, with the forced-draft fan module arranged on the center of the rear surface thereof, in such a manner that the heat dissipated by the forced-draft fan module is discharged more quickly.

In addition, although not illustrated, a mounting unit (not illustrated) with which a clamping device (not illustrated) for combing the antenna apparatus 100 with the support pole (not illustrated) is combined may be integrally formed with some of the multiplicity of rear heat dissipation pins 111. In this case, the clamping device may be configured to adjust the directivity of the antenna apparatus 100 according to the third embodiment of the present disclosure, which is installed on an upper end portion of the clamping device, by rotating the antenna apparatus 100 in the leftward-rightward direction or by tilting the antenna apparatus 100 in the upward-downward direction.

However, the clamping device for tilting or rotating the antenna apparatus 100 is not necessarily combined with the mounting unit. For example, in a case where the antenna apparatus 100 is installed on the inside or outside wall of the building in a wall-mounted manner, it is also possible that a clamp panel in the form of a latch-shaped plate that is easy to combine in a wall-mounted manner is combined with the mounting unit.

The RF module 200 according to the present disclosure will be described in more detail below with reference to the accompanying drawings.

The RF module 200 may include an RF filter 140, a radiation element module 160, and an amplification unit board 146. Furthermore, the RF module 200 may further include a reflector 150 that serves as a ground connection (GND) to the radiation element module 160. However, the reflector 150 may not only serve as the ground connection to the radiation element module 160, but may also serve to protect from the outside the RF filter 140 exposed to outside air in front that is defined as being a space in front of the front surface of the front housing 130 of the antenna housing 105 described below.

The RF module 200 configured in this manner, as illustrated in FIGS. 2 to 5, may be arranged to be stacked on a front surface of the main board 120 with the front housing 130 of the antenna housing 105 in between.

In the antenna apparatus 100 according to the third embodiment of the present disclosure, a plurality of RF filters 140 are provided and thus constitute the antenna RF module assembly 300.

In this case, a configuration is employed in which a total of 32 RF filters 140, as illustrated in FIGS. 2 and 3, are arranged adjacent to each other in four rows in the leftward-rightward direction and in 8 columns in the upward-downward direction. However, the RF filters 150 are not necessarily limited to this arrangement. Of course, it is to be naturally expected that the positions of the RF filters 150 in the arrangement and the number of the RF filters 140 may be variously changed during the design phase.

In addition, the RF filter 140 according to the first embodiment of the present disclosure is described, taking as an example a cavity filter in which a predetermined side thereof and which is cavity is formed in a first configured to include a dielectric resonator or a metal resonance bar in the predetermined cavity. However, the RF filter 140 is not limited to this cavity filter, and various filters, such as dielectric filer, may be used as the RF filter 140.

Furthermore, a multiplicity of radiation element modules 160 are correspondingly combined with a multiplicity of RF filters 140, respectively. Each of the multiplicity of radiation element modules 160 implements 2T2R antennas. Therefore, the antenna apparatus 100 according to the third embodiment of the present disclosure adopts, for example, a model that implements 64T64R antennas, but is not limited to this model.

The RF module 200, as described above, may further include the reflector 150 that is arranged in such a manner as to cover the multiplicity of RF filters 140 and serves as the ground connection to the multiplicity of radiation element modules 160. To this end, it is desired that the reflector 150 is made of a metal material.

In this case, the reflector 150 may further function as a reflective layer of the radiation element module 160. Therefore, the reflector 150 may reflect an RF signal that is output from the radiation element module 160, toward a direction that corresponds to the directivity of the RF signal and may concentrate the RF signal.

Furthermore, the reflector 150 may perform a function of dissipating system heat generated from the antenna apparatus 100 to outside air, as a function unique to the RF module 200 according to the third embodiment of the present disclosure.

To this end, the reflector 150, as illustrated in FIG. 6, may be formed in the form of a mesh in which a multiplicity of heat dissipation holes 155 are drilled. The multiplicity of heat dissipation holes 155 are configured to serve to cause the inside and outside of the reflector 150 to communicate with each other and may serve as a heat discharge hole through which heat generated from the RF filter 140 positioned in a space in back of the reflector 150 is discharged to outside the reflector 150. Accordingly, outside air may be actively used to dissipate the heat generated in the antenna apparatus 100.

A size of the heat dissipation hole 155 may be appropriately designed by simulating the durability and the heat dissipation characteristics of the reflector 150. Particularly, the size of the heat dissipation hole 155 may be designed considering a wavelength of an operating frequency in order to keep a smooth grounding (GND) function performed. For example, the heat dissipation holes 155 may be set to have a size range of $\frac{1}{10}\lambda$ to $\frac{1}{20}\lambda$ of the operating frequency.

In this case, the size of $\frac{1}{10}\lambda$ has its meaning as an upper limit threshold value at which the reflector 150 serves as the ground connection (GND) to the radiation element module 160, and the size of $\frac{1}{20}\lambda$ has its meaning as a lower limit threshold value at which a minimum flow of outside air is secured through the heat dissipation hole 155 in the reflector 150.

Therefore, it is desired that the heat dissipation hole 155 is formed in such a manner that the size thereof is greater than $\frac{1}{20}\lambda$ of the operating frequency, but is smaller than $\frac{1}{10}\lambda$ of the operating frequency.

Particularly, the reflector 150 may be defined as one constituent element that is provided between the multiplicity of RF filters 140 and the multiplicity of radiation element modules 160 in terms of providing the ground (GND) function and performs a common ground function.

More particularly, the reflector 150, as illustrated in FIG. 6, may be formed in the form of a rectangular metal plate in such a manner as to be stacked on front ends of the multiplicity of RF filters 140. An antenna arrangement unit 151 on which each of the radiation element modules 160 described below is seated may be formed, in the form of a flat plate, on a front surface of the reflector 150 in a manner that corresponds to a position of the RF filter 140. In this case, since the antenna arrangement unit 151 is formed in the form of a flat plate, the filter body 141 that constitutes the RF filter 140 in the rear is seated on the antenna arrangement unit 151 in such a manner that a front surface thereof is brought into surface contact with the antenna arrangement unit 151 for heat transfer, and the radiation element module 160 in the front is seated on the antenna arrangement unit 151 in such a manner that a rear surface thereof is brought into surface contact with the antenna arrangement unit 151 for heat transfer. Thus, the performance in heat dissipation can be improved in a manner that transfers heat.

In addition, as illustrated in FIG. 6, edge portions of the reflector 150 extend backward, thereby forming edge backward-extending plates 154, respectively. The edge backward-extending plates 154 surround lateral sides of the multiplicity of RF filters 140 combined with the front surface of the front housing 130 in order to protect the multiplicity of RF filters 140. A multiplicity of screw fixation grooves 153 are formed at a multiplicity of positions, respectively, along edges of the edge backward-extending plate 154 in such a manner as to be spaced apart from each other. The reflector 150 may be combined with the front housing 130 in such a manner as to be positioned in front of the front housing 130 by performing an operation of fastening a multiplicity of assembly screws (to which a reference numeral is not assigned) to the multiplicity of fixation grooves 153 and a multiplicity of screw through-holes 133 formed along an edge of the front housing 130.

The RF module 200, as illustrated in FIGS. 2 to 5, may be detachably combined with the antenna housing 105. The RF module 200 may be physically fastened to the front housing 130 in a bolted manner (or in a screwed manner) or the like. The amplification unit board 146 that constitutes the RF module 200 may be detachably attached, in a socket-pin coupling manner, to the main board 120. Specifically, a male socket 146' in FIG. 12*a* that will be described below may be provided on the amplification unit board 146, and a female socket 125 with which a male socket 146' of the amplification unit board 146 is combined in a socket-pin coupling manner may be provided on the front surface of the main board 120. A specific configuration and function of the amplification unit board 146 will be described in more detail below.

The front housing 130, as illustrated in FIGS. 3*a* and 3*b*, serves to separate the main board 120 seated in the internal space 110S in the antenna housing 105 by being installed therein and the RF module 200 arranged in a stacked manner on the front surface of the main board 120. In addition, the front housing 130 may be provided in such a manner as to separate the internal space 110S positioned to the side of the antenna housing 105 and the other space from each other. Thus, the front housing 130 may perform thermal blocking and thermal separation functions, in such a manner that heat generated in the internal space 110S positioned toward the direction of the antenna housing 105 does not have an influence toward the RF filter 140.

It is desired that the "thermal blocking" here is understood as meaning that heat generated from the RF module 200 positioned in the outside air in front that is defined as the space in front of the front surface of the front housing 130 is blocked from being transferred toward a space in a rear surface of the front housing 130 (that is, toward the internal space 110S in the rear housing 110). Moreover, it is desired that, for a separate thermal configuration, the "thermal separation" here is understood as meaning that some of a multiplicity of elements from which heat is generated during operation and which are originally mounted in a concentrated but dispersed manner on the front and rear surfaces of the main board 120 installed in a contacted manner in the internal space 110S in the rear housing 110 are configured to be separately arranged in such a manner as to possibly dissipate the heat not only in the rear direction, but also in the front direction, In addition, in a current situation where a large number of manufacturers that manufacture antenna apparatuses and components included in the antenna apparatus, or equipment items are available on the market, manufacturers that manufacture only the RF module 200 are capable of distributing and selling a multiplicity of RF modules 200 in a state of being temporarily pre-assembled to the front housing 130 or on a per-module basis for pre-assembling and thus have the advantage of being capable of establishing a new market environment.

The multiplicity of screw through-holes 133 for fixing the reflector 150 in a screwed manner may be installed at a multiplicity of positions along the edge of the front housing 130. In addition, at least one through-slit 135 may be formed in the front housing 130. The male sockets 146' formed on the amplification unit board 146 of the RF filter 140 pass through the front housing 130 for being combined with the female sockets 125, respectively, in the main board 120 in a socket-pin coupling manner.

In a case where the antenna apparatus 100 according to the third embodiment of the present disclosure is installed outside a building (that is, outdoors), in the event of rain, rainwater may penetrate between the edge portion of the rear surface of the front housing 130 and the edge portion of the front surface of the rear housing 110 due to exposure to the outside through the heat dissipation hole 155 in the above-described reflector 150. In this case, a waterproof gasket ring (not illustrated) for preventing introduction of the rainwater or the like may be interposed between the edge portion of the rear surface of the front housing 130 and the edge portion of the front surface of the rear housing 110. In addition, foreign-material introduction-prevention rings (not illustrated) may be interposed into front surfaces and rear surfaces, respectively, of a multiplicity of through-slits 135 that pass through the front housing 130. The foreign-material introduction-prevention rings protect from the outside the male sockets 146' of the amplification unit board 146 that pass through the multiplicity of through-slits 135, respectively, and prevent foreign materials, such as rainwater, from being introduced toward the internal space 110S in the rear housing 110 through the multiplicity of through-slits 135.

In this manner, in the antenna apparatus 100 according to the third embodiment of the present disclosure, a predetermined electrical signal line is established in a simple socket-pin coupling manner between the main board 120 and the RF filter 140. Accordingly, there is no need to use a separate direct coaxial connector (DCC) for electrically connecting the RF filter 140 in the related art and the main board 120 to each other. Thus, the advantage of greatly reducing a product manufacturing cost can be achieved.

However, the establishing of the electrical signal line in a socket-pin coupling manner for the RF filter 140 can be understood as bringing about an advantageous effect in terms of electrical connection. Of course, it can be expected that a multiplicity of screw fastening techniques are possibly used in order to prevent an arbitrary movement of the RF filter 140 in terms of physical coupling. For example, as described below with reference to FIGS. 12*a* and 12*b*, in order to fasten the RF filter 140 to the front housing 130, fixation screws 142 are screwed into a multiplicity of f screw through-holes 142*a*, respectively, formed in an edge of a rear end portion of the filter body 141 that constitutes the RF filter 140. Thus, the effect of firmly holding the RF filter 140 can be achieved using this screw fastening technique.

Figure 7:
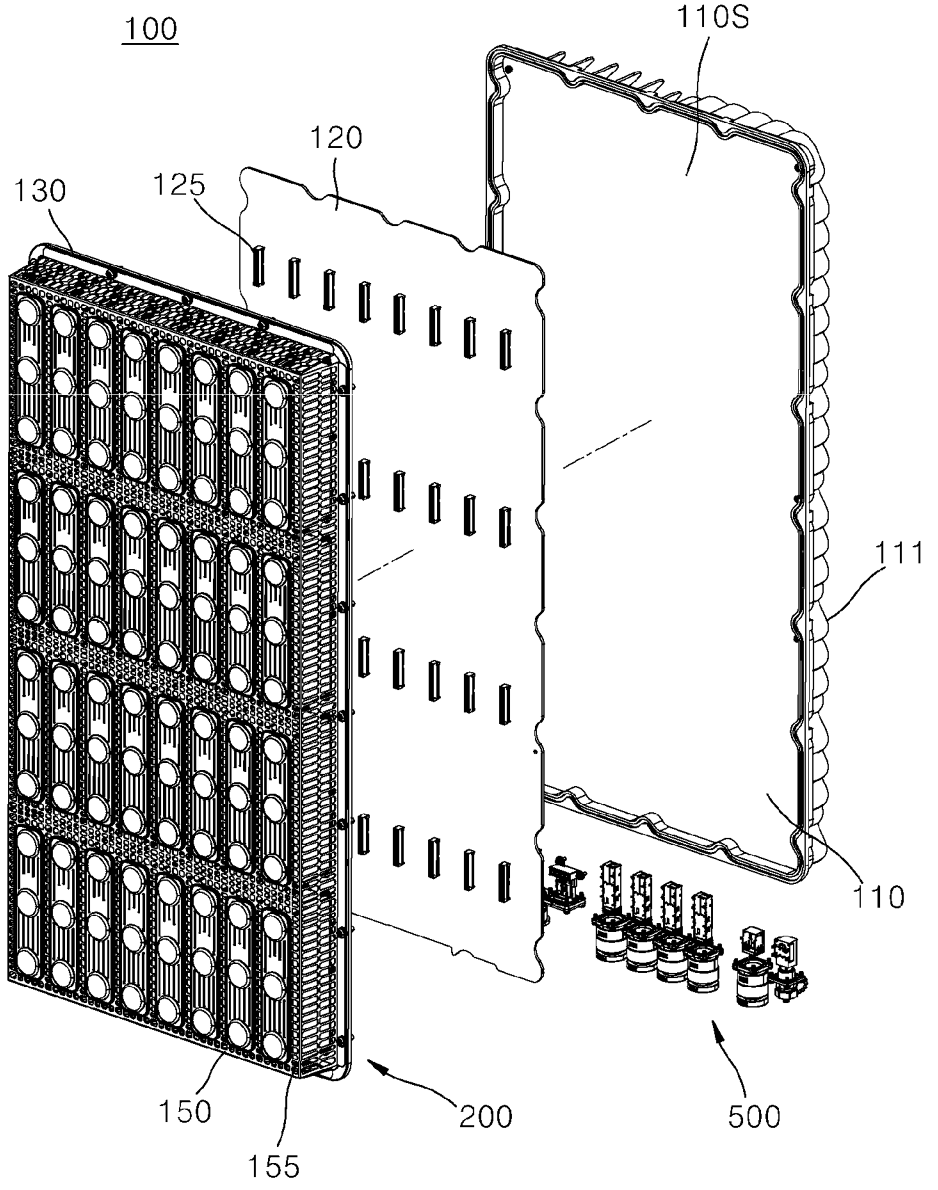
FIG. 7 is a perspective view illustrating a state where a main board, one of the constituent elements in FIG. 2, is installed in a rear housing.
Figure 8:
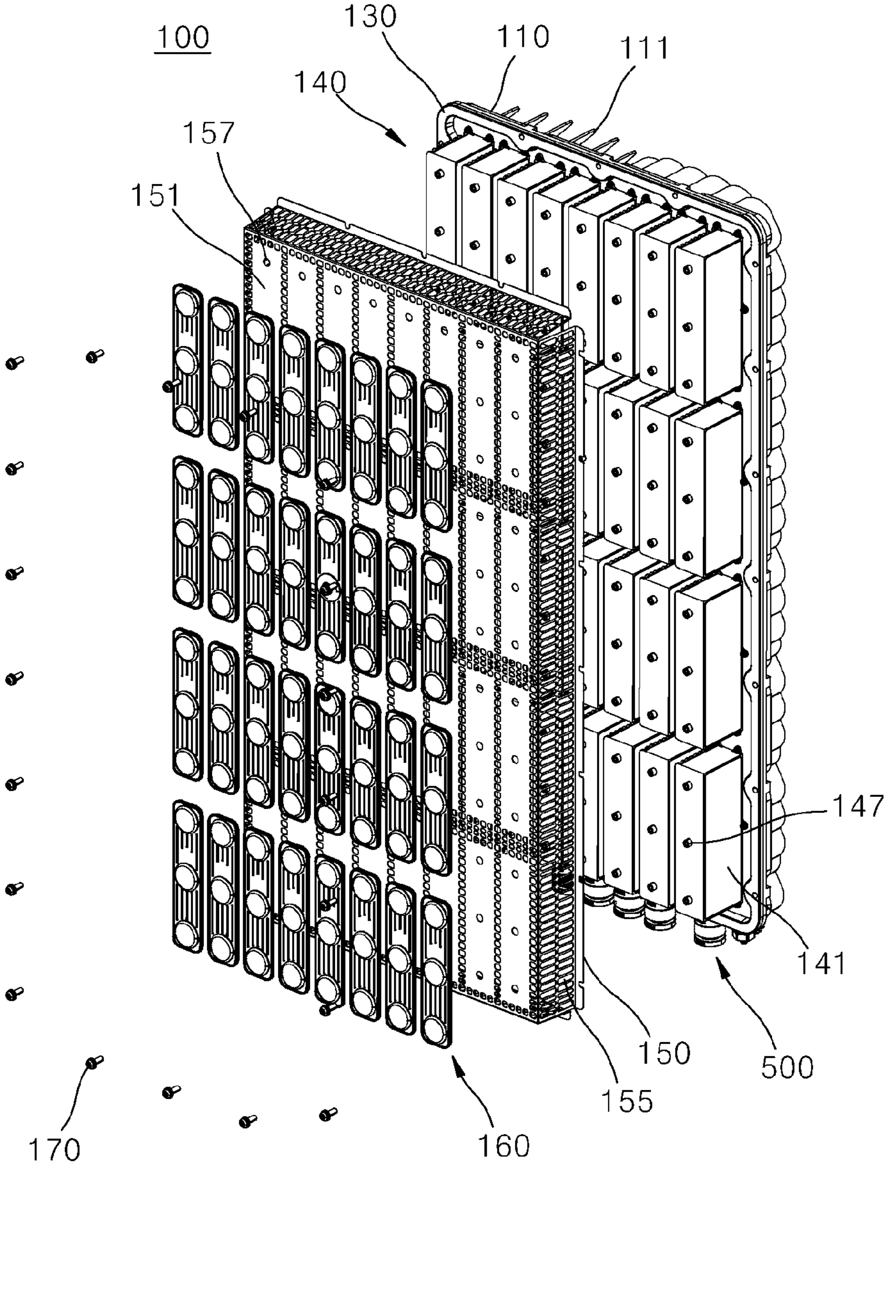
FIG. 8 is an exploded perspective view illustrating a state where an RF module, one of the constituent elements in FIG. 2. is installed on the main board.
Figure 9:
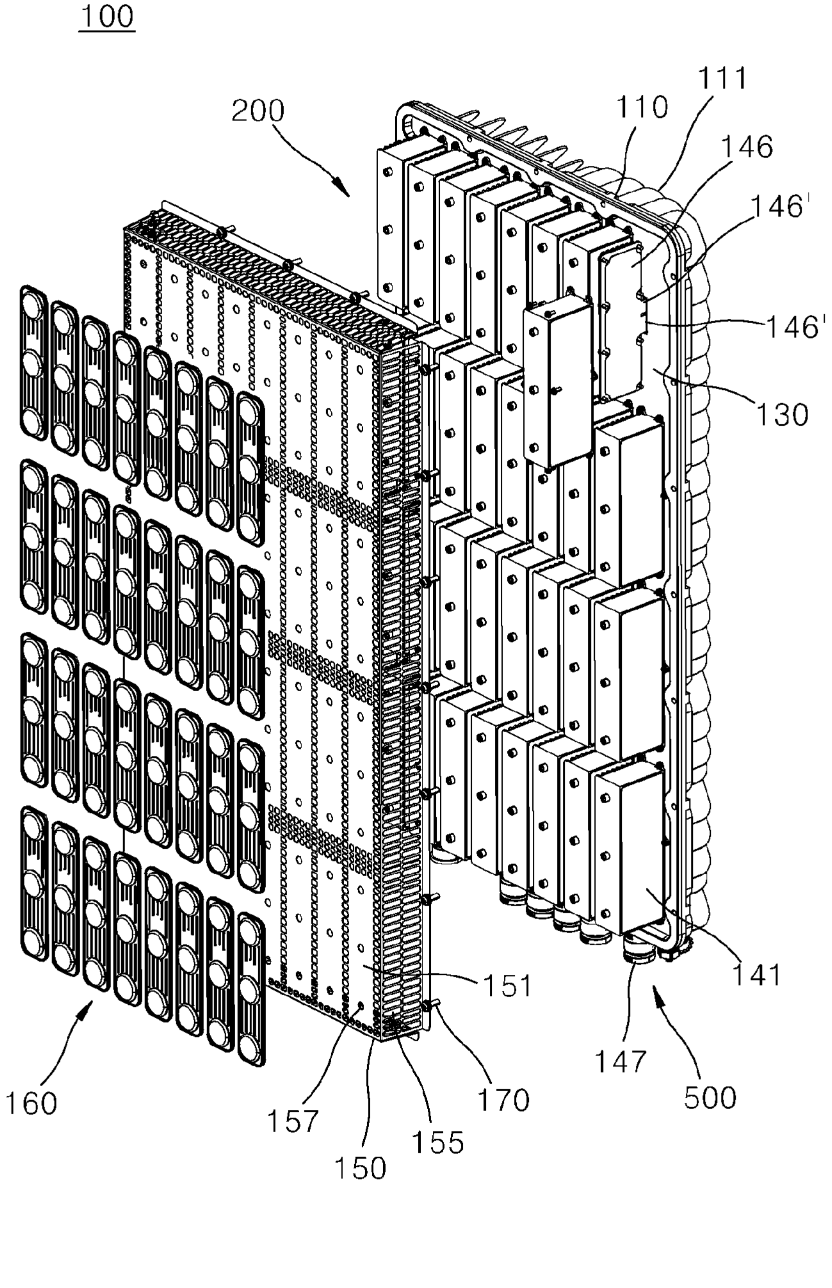
FIG. 9 is a perspective view illustrating a state where a filter body is separated from the rear housing during installation in FIG. 8.
Figure 10:
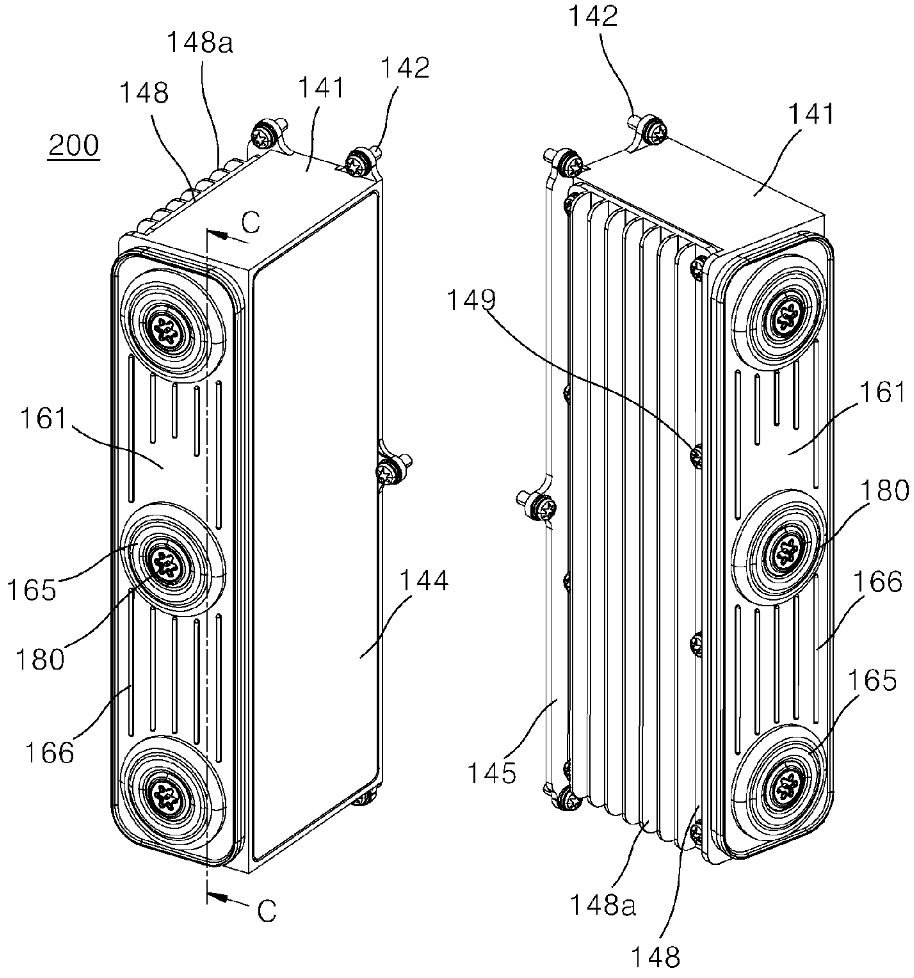
FIG. 10 is a perspective view illustrating the RF module, one of constituent elements in FIG. 8.
Figure 11:
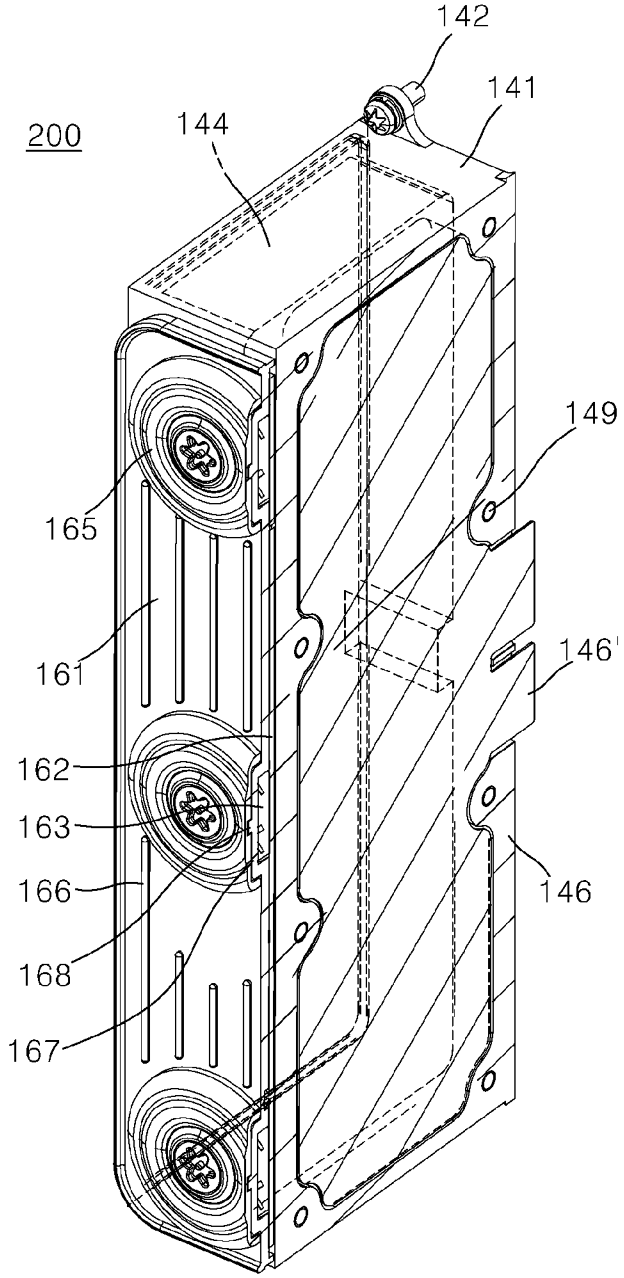
FIG. 11 is a cut-away projective perspective view projectively illustrating one portion of the inside of the RF module, as a cross-sectional view taken along line C-C on FIG. 10.
Figure 12A:
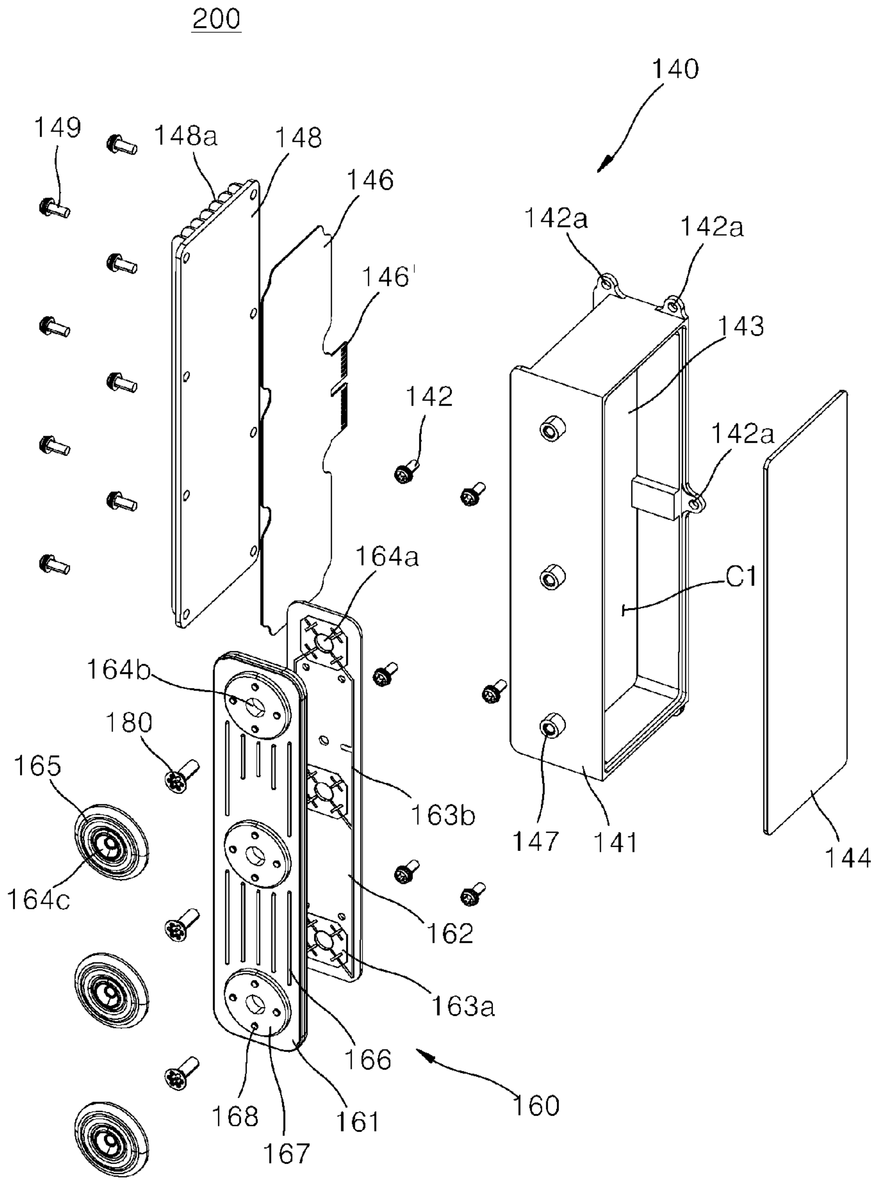
FIGS. 12*a* and 12*b* are exploded perspective views each illustrating the RF module in FIG. 10.
Figure 12B:
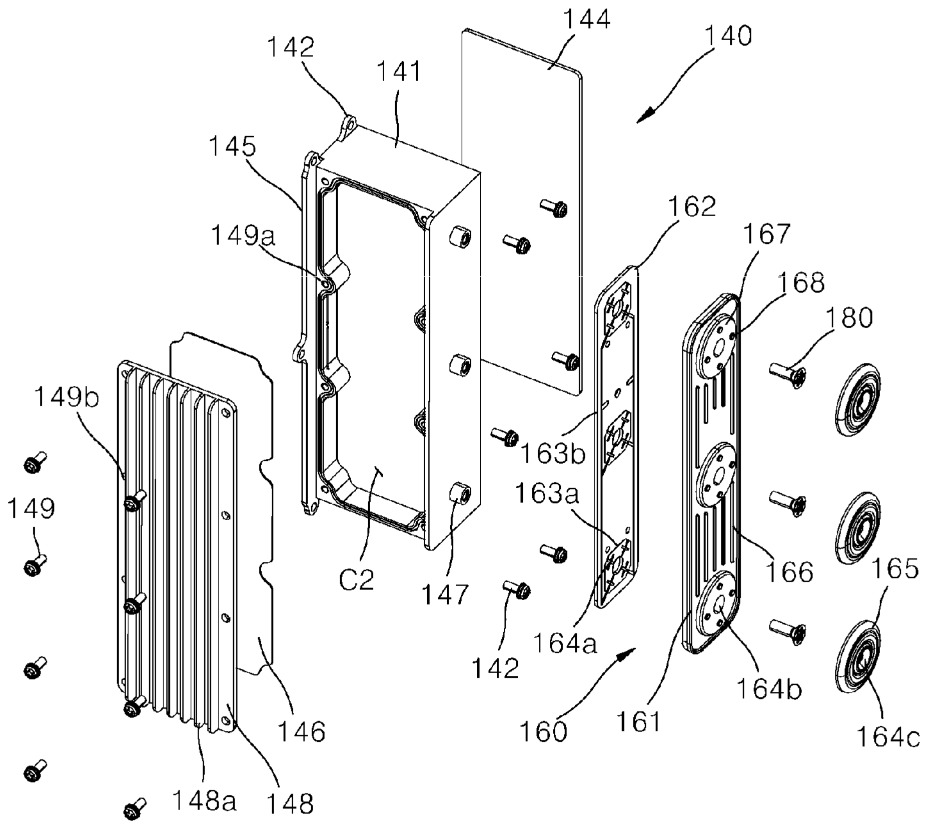
Figure 13:
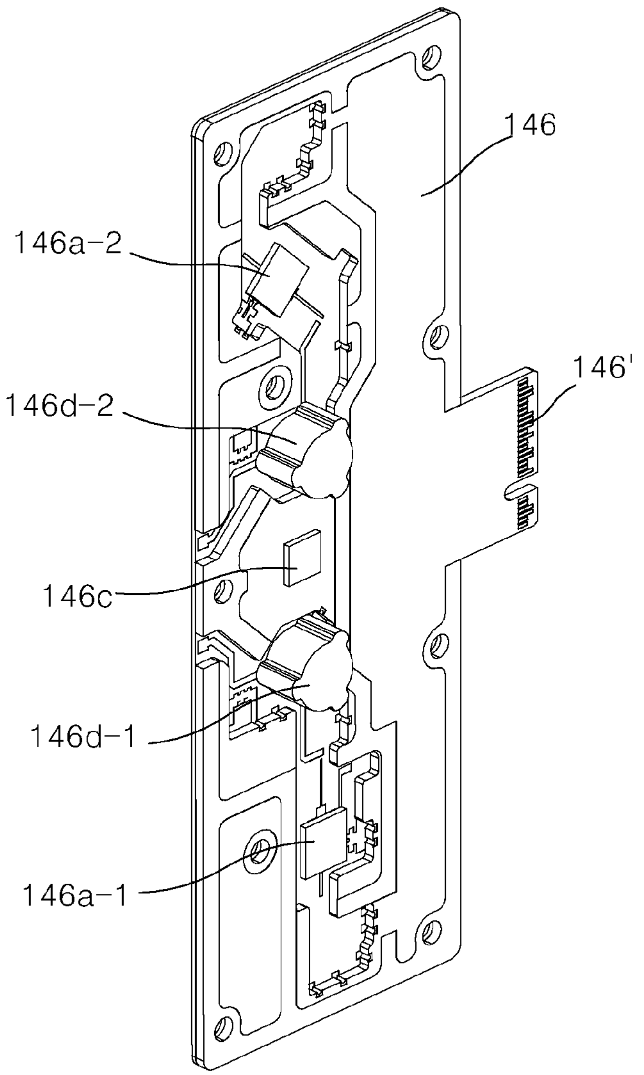
FIG. 13 is a view illustrating in detail an amplification unit board, one of the constituent elements of the RF module in FIG. 10.
Figure 14:
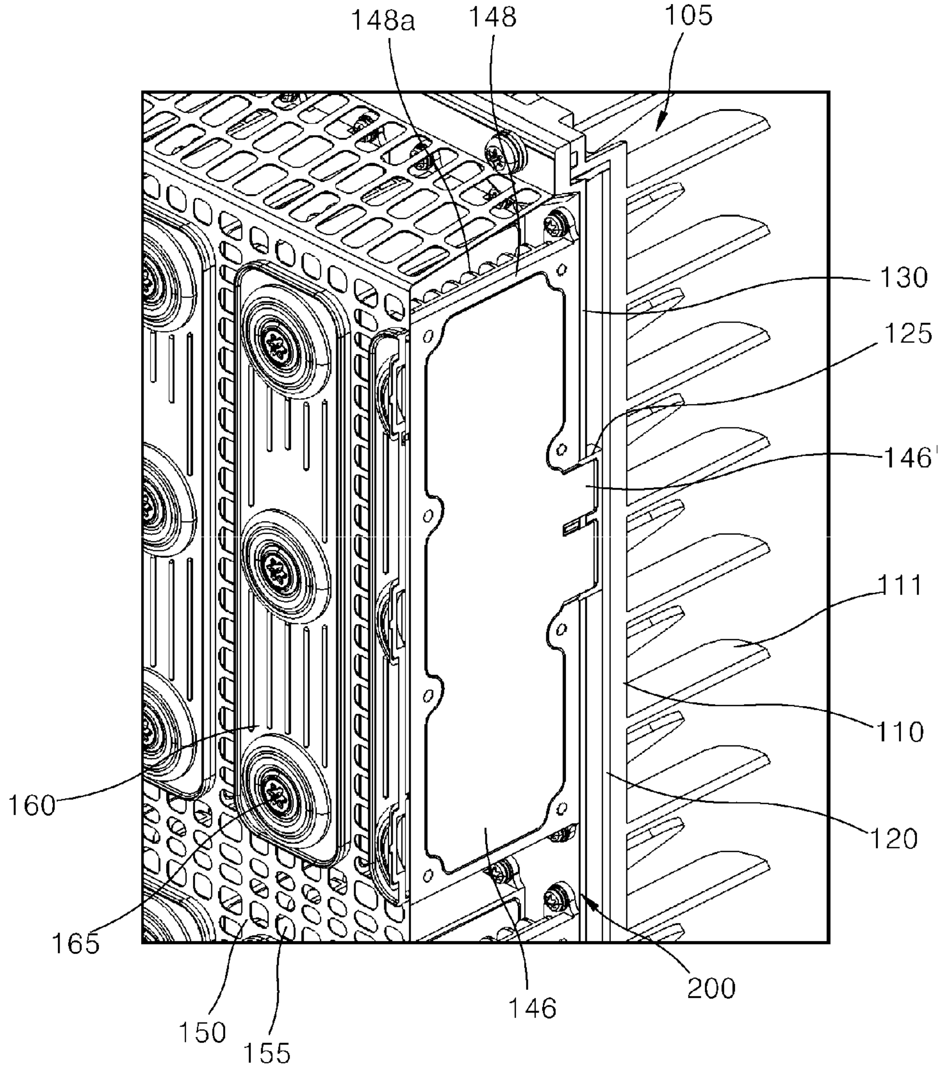
FIG. 14 is a vertically-cut perspective view illustrating a state where the amplification unit board is combined with the main board.
Figure 15:
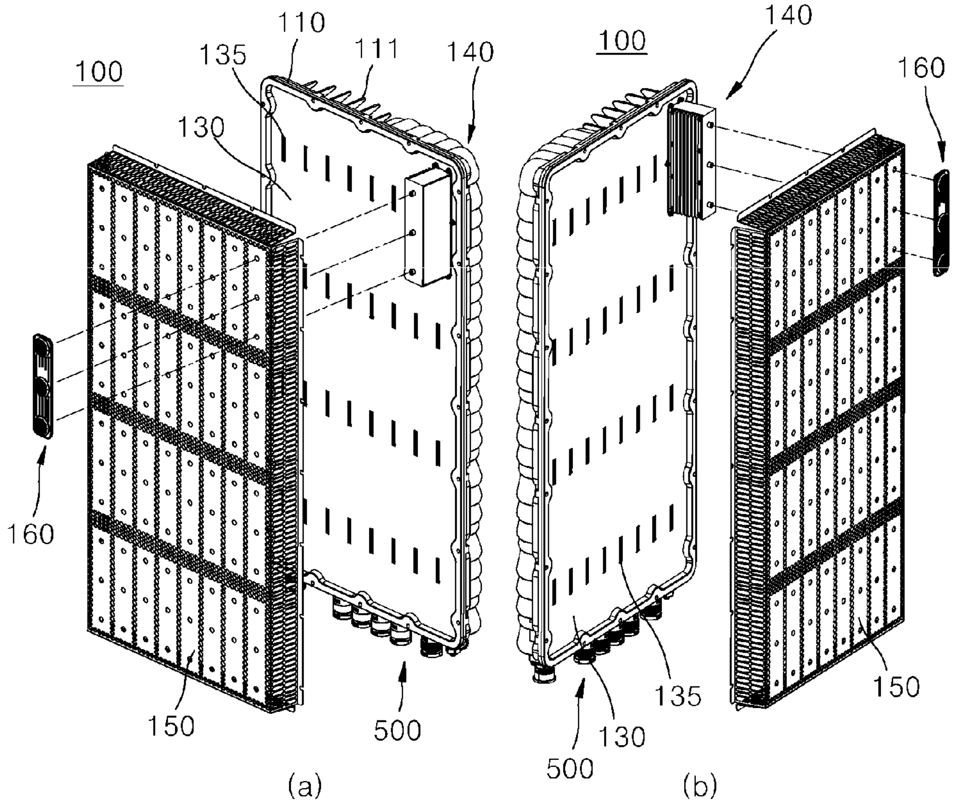
FIG. 15 is an exploded perspective view illustrating a state where the RF module, one of the constituent elements in FIG. 3, is assembled to the main board.
Figure 16:
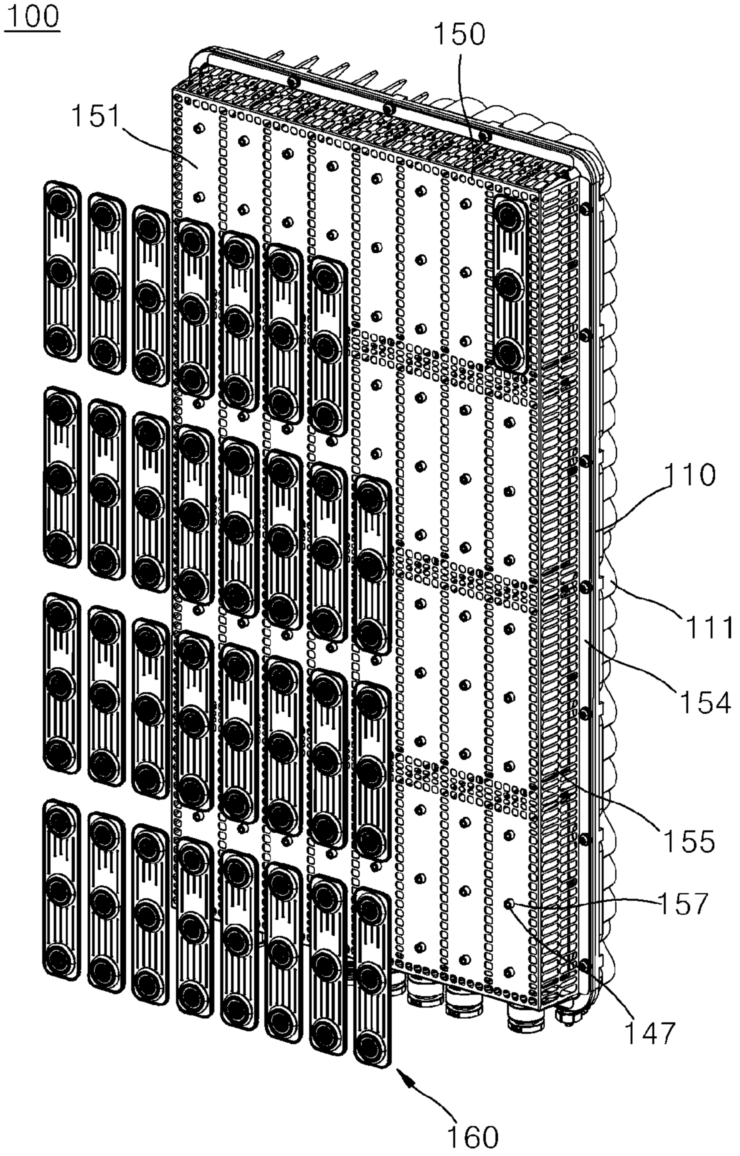
FIG. 16 is an exploded perspective view illustrating a state where a radiation element module, one of the constituent elements in FIG. 3, is assembled to a reflector.

FIG. 7 is an exploded perspective view illustrating a state where the main board 120, one of the constituent elements in FIG. 2, is installed in the rear housing 110. FIG. 8 is an exploded perspective view illustrating a state where the RF module, one of the constituent elements in FIG. 2, is installed on the main board 120. FIG. 9 is a perspective view illustrating a state where the filter body 141 is separated from the rear housing 110 during installation in FIG. 8. FIG. 10 is a perspective view illustrating the RF module 200, one of constituent elements in FIG. 8. FIG. 11 is a cut-away projective perspective view projectively illustrating one portion of the inside of the RF module 200, as a cross-sectional view taken along line C-C on FIG. 10. FIGS. 12*a* and 12*b* are exploded perspective views each illustrating the RF module 200 in FIG. 10. FIG. 13 is a view illustrating in detail the amplification unit board 146, one of constituent elements of the RF module 200 in FIG. 10. FIG. 14 is a vertically-cut perspective view illustrating a state where the amplification unit board 146 is combined with the main board 120. FIG. 15 is an exploded perspective view illustrating a state where the RF module 200, one of constituent elements in FIG. 3, is assembled to the main board 120. FIG. 16 is an exploded perspective view illustrating a state where the radiation element module 160, one of the constituent elements in FIG. 3, is assembled to the reflector 150.

As a first implementation example, the RF module 200 according to the first embodiment of the present disclosure may include the RF filter 140, the radiation element module 160 which is arranged on a first side of the RF filter 140, and the amplification unit board 146 which is arranged on a second side of the RF filter 140 and on which an analog amplification element is mounted.

In this case, the RF filter 140 may be formed in such a manner as to have at least four external surfaces. That is, in a case where the RF filter 140 has the four external surfaces, the RF filter 140 is provided as a tetrahedron. Moreover, in a case where the RF filter 140 has five external surfaces, the RF filter 140 is provided as a pentahedron, and, in a case where the RF filter 140 has six external surfaces, the RF filter 140 is provided as a hexahedron. Therefore, in a case where the terms "first side" and "second side" of the RF filter 140 are used hereinafter, "first side" means any one surface of at least four external surfaces, and "second side" means any one surface other than the above-mentioned surface. That is, it should be understood that "first side" means any one surface and that "the other side" means any other surface of the external surfaces that do not include the above-mentioned surface. Conceptually, "first side" and "second side" do not refer to surfaces, respectively, that are physically positioned in completely opposite directions.

Therefore, as a second implementation example, in the RF module 200 according to the first embodiment of the present disclosure, as illustrated in FIGS. 2 to 5, heat generated in the RF filter 140 and heat generated in the analog amplification element may be defined as being dissipated in different directions, respectively.

The antenna RF module 200 according to the first embodiment of the present disclosure element employs a configuration where the amplification unit board 146 is arranged inside the RF filter 140. In this respect, it is natural that, as a third implementation example, an exterior shape of the RF module 200 may be defined as being substantially formed by the RF filter 140 and the radiation element module 160 provided on a front end portion of the RF filter 140.

In addition, the RF module 200 is an assembly of analog RF components. For example, the amplification unit board 146 is an RF component on which an analog amplification element amplifying the RF signal is mounted. The RF filter 140 is an RF component for frequency-filtering the input RF signal to obtain an RF signal in a desired frequency band. The radiation element module 160 is an RF component that serves to receive and transmit the RS signal.

As a fourth implementation example, the RF module 200 according to the first embodiment of the present disclosure may be defined as follows.

The RF module 200 according to the present disclosure serves as an RF module 200 including an analog RF component. The analog RF component includes the RF filter 140 having at least four external surfaces, the radiation element module 160 that is arranged on any one external surface of the external surfaces of the RF filters 140, and analog amplification elements 146*a*-1, 146*a*-2, and 146*c* on the amplification unit board 146 arranged on any other external surface of the external surfaces of the RF filter 140.

In this case, the amplification unit board 146 may be electrically connected to the main board 120 inside the antenna housing 105. More specifically, as described below, the amplification unit board 146 may be electrically connected, in a socket-pin coupling manner, to the main board 120.

In addition, as a fifth implementation example, conceptually, the RF module 200 may be defined as including the RF filter 140, the radiation element module 160 arranged on a front surface of the RF filter 140, and the reflector 150 that is arranged between the RF filter 140 and the radiation element module 160 and not only grounds (GND) the radiation element module 160, but also acts as an intermediary for dissipating heat generated in the RF filter 140 to the outside.

More specifically, in the fifth implementation example, the antenna RF module 200 according to the first embodiment of the present disclosure may include the RF filter 140 arranged to be stacked on the front surface of the main board 120 installed in the internal space 110S in the antenna housing 105, the radiation element module 160 arranged to be stacked on the front surface of the RF filter 140, and the reflector 150 that is arranged to cover the RF filter 140 and serves to ground (GND) the radiation element module 160 and, at the same time, acts as an intermediary for dissipating heat generated from the direction of the RF filter 140 to the outside. In this case, it is natural that the reflector 150, as described above, may further function as the reflective layer from which a radiation signal may be emitted in a concentrated manner.

Particularly, when it is assumed that the RF filter 140 has at least four external surfaces, the radiation element module 160 is arranged to be stacked on any one surface (a front surface) of the RF filter 140 and the amplification unit board 146 is arranged on any other surface of the external surfaces of the RF filter 140. Heat generated from the amplification unit board 146 on which at least one analog amplification element is mounted may be dissipated through one of sidewalls of the RF filter 140 adjacent to the amplification unit board 146 and then may be finally dissipated to the outside through the reflector 150.

In a sixth implementation example, [the RF module ] [“RE module”으로 약칭] according to the first embodiment may be detachably combined with the antenna housing 105. That is, in the sixth implementation example, the antenna RF module 200 according to the first embodiment may be defined as including the RF filter 140, the radiation element module 160 that is arranged in the front surface of the RF filter 140, and the reflector 150 arranged between the RF filter 140 and the radiation element module 160. The RF module 200 may be detachably combined with the antenna housing 105. Specifically, a target constituent element to which the RF module 200 is detachably attached is the main board 120, one of constituent elements of the antenna housing 105, that is arranged in the internal space 110S in the rear housing 110. The RF module 200 may be detachably combined with the main board 120 with the front housing 130 in between.

Accordingly, RF components having frequency dependence are configured as the RF module 200, and the RF module 200 is configured to be detachably attachable to the antenna housing 105. Thus, in a case where an RF component constituting the antenna apparatus 100 is defective or damaged, only the corresponding RF module 200 is replaced. Accordingly, the advantage of making maintenance of the antenna apparatus 100 facilitated can be achieved.

In addition, the reflector 150 is arranged in such a manner as to cover the RF filter 140, but in such a manner as to cover the entire RF filter 140 exposed in a manner that protrudes out of the front housing 130 in the outward direction from the inner space 110S in the antenna housing 105. In this manner, the reflector 150 is designed in such a manner that the arrangement use protects from the outside environment the RF filter 140 exposed to the outside air in front (space in front) that is defined as the space in front of the front surface of the front housing 130 and at the same time in such a manner that air smoothly flows into and out of through the numerous heat dissipation holes 155. High performance in heat dissipation toward the front direction can be achieved.

An antenna RF module assembly 300 according to a second embodiment of the present disclosure that will be described below may be configured with a plurality of RF modules 200 that are implemented as the various implementation examples described above.

The multiplicity of RF filters 140, as illustrated in FIGS. 12*a* and 12*b*, may each include the filter body 141 forming predetermined spaces C1 and C2 in a first side in the width direction and a second side, respectively, with a separation wall 143 in the center, a multiplicity of resonators (DR) (not illustrated) installed in a multiplicity of cavities (not illustrated), respectively, that are provided in any one (refer to reference numeral “C1” in FIG. 12*a*) of the predetermined spaces C1 and C2, and the amplification unit board 146 arranged in the other one (refer to reference numeral “C2” in FIG. 12*b*) of the predetermined spaces C1 and C2 and electrically connected to the female socket 125 in the main board 120 by being combined therewith. In this case, the filter body 141 is made of a metal material and is manufactured using a die-casting formation technique.

The multiplicity of RF filters 140 may be provided, for being arranged, as cavity filters that filters an input signal to get a desired output signal in a frequency band by adjusting a frequency using the multiplicity of resonator (DR) installed to the side of the space “C1” of the predetermined spaces. However, the RF filter 140 is not necessarily limited to the cavity filter. As described above, a ceramic waveguide filter is not excluded.

The RF filter 140 having a small thickness in the forward-backward direction is advantageous for a design for thinning an entire product. In terms of the design for thinning an entire product, it is considered that the ceramics waveguide filter that is more advantageous in a design for miniaturization than the cavity filter that is design-limited in a reduction in the thickness in the forward-backward direction is used as the RF filter 140. However, in order to satisfy high-output performance requirements that a base-station antenna has to comply with in a 5G frequency environment, the resulting problem of having to dissipate heat generated in an antenna has to be necessarily solved. The use of the cavity filter may be preferred in that heat generated in the RF filter 140 may be transferred to the front of the antenna housing 105 by utilizing the RF filter 140 as an intermediary in order to effectively discharge the heat generated inside the antenna.

Particularly, the multiplicity of RF filters 140 in the antenna apparatus 100 according to the third embodiment of the present disclosure are installed in the form of the RF module 200 in such a manner as to protrude from the limited inner space 110S in the antenna housing 105 and thus to be directly exposed to outside air. Accordingly, heat is possibly dissipated through surfaces other than the installation surface of the RF filter 140. In this respect, the use of the cavity filter may be much more preferred. An example where the cavity filter is used as the RF filter 140 in the antenna apparatus 100 according to the third embodiment of the present disclosure will be described below.

In the antenna apparatus 100 according to the third embodiment of the present disclosure, as illustrated in FIGS. 10 to 12*b*, a RFIC element (not illustrated), power amplifier (PA) elements 146*a*-1 and 146*a*-2, and a low noise amplifier (LNA) element 146*c* that are RF elements that would be mounted on the front or rear surface of the main board 120 in the related art are mounted separately from the amplification unit board 146 of the RF filter 140, and all the RF filters 140 are installed in such a manner as to be exposed to outside air. Thus, the advantage of greatly improving the performance in heat dissipation is provided.

That is, in the related art, the radome installed in front of the antenna housing 105 is an obstacle that prevents heat dissipation toward the front direction. Moreover, along with RF elements (an RFIC, a PA, an LNA element, and the like), digital element or PSUs from which a large amount of heat is generated are mounted on the main board 120 in a concentrated manner. Thus, a problem occurs in that heat is generated in a concentrated manner inside the antenna housing 105. In addition, the concentrated heat has to be dissipated in a concentrated manner only toward the rear direction of the antenna housing 105. Thus, there occurs a problem in that the performance in heat dissipation is greatly increased.

However, in the antenna apparatus 100 according to the third embodiment of the present disclosure, as illustrated in FIG. 13, the multiplicity of RF modules 200 are installed in the front direction in a manner that is separated from the internal space 110S in the antenna housing 105, but in such a manner as to be directly exposed to outside air. Moreover, the amplification unit board 146 is additionally mounted on one portion of a sidewall of the RF filter 140, and RF elements 146*a*-1, 146*a*-2, and 146*c* that would be mounted on a main board in the related art are arranged thereon in a distributed manner. Thus, heat can be distributed, and the distributed heat can be dissipated more quickly to the outside.

In this case, the RF elements 146*a*-1, 146*a*-2, and 146*c* may be analog amplification elements and, as described above, include power amplifier elements 146*a*-1 and 146*a*-2, low noise amplifier element 146*c*, and the like.

More specifically, PA elements 146*a*-1 and 146*a*-2 in one pair that are the analog amplification elements may be arranged to be mounted on any one of both surfaces of the amplification unit board 146. Moreover, the LNA element 146*c*, one of the analog amplification elements, may be arranged to be mounted thereon. A circulator 146*d*-1 that decouples both the PA element 146*a*-1 and the LNA element 146*c*, and a circulator 146*d*-2 that decouples both the PA element 146*a*-2 and the LNA element 146*c* may be circuit-connected to each other.

However, the above-described analog amplification elements are not necessarily mounted on only any one of the both surfaces of the amplification unit board 146. Of course, it is to be naturally expected that, according to an implementation example, the above-described analog amplification elements may be arranged to be mounted on the both surfaces of the amplification unit board 146 in a distributed manner.

In addition, the amplification unit board 146 is separately mounted toward the RF filter 140. Thus, the number of layers of the main board 120 that is multi-layered may be reduced. In this respect, the advantage of reducing the cost of manufacturing the main board 120 is provided.

The amplification unit board 146 may be installed within the other one C2 of the predetermined spaces C1 and C2 in such a manner as to be seated therewithin, but so that an end portion of at least the male socket 146' may be exposed in a manner that protrudes toward a rear surface of the filter body 141.

The multiplicity of RF filters 140, as illustrated in FIGS. 10 to 12*b*, may further include a filter heat sink panel 148 that dissipates heat, generated from the amplification unit board 146, from the predetermined space C2 to outside of the filter body 141.

A multiplicity of screw fixation holes 149*a* are formed in the vicinity of the predetermined space C2 in the filter body 141, and a multiplicity of screw through-holes 149*b* are formed in an edge portion of the filter heat sink panel 148. The multiplicity of fixation screws 149 pass through the multiplicity of screw through-holes 149*b*, respectively, from outside of the filter body 141 and are fastened to the multiplicity of screw fixation holes 149*a*, respectively, thereby fixing the filter heat sink panel 148 to the filter body 141.

In this case, the amplification unit board 146 is installed inside the predetermined space C2 in the filter body 141 in such a manner that an external surface thereof is brought into surface contact with an internal surface of the filter heat sink panel 148 for heat transfer. Heat generated from the amplification unit board 146 may be transferred through the filter heat sink panel 148 and may be discharged to the outside through a filter heat sink pins 148*a* integrally formed on the outside of the filter heat sink panel 148.

Although not illustrated, the RF module 200 according to the first embodiment of the present disclosure may further include a heat transfer intermediary that is arranged between the filter heat sink panel 148 and the amplification unit board 146, absorbs the heat generated from the amplification unit board 146, and transfers the absorbed heat to the filter heat sink panel 148.

The heat transfer intermediary may be configured as any one of a vapor chamber and a heat pipe that are provided in such a manner as to transfer heat through a phase change of a refrigerant that flows inside the vapor chamber or the heat pipe that is closed. In a case where a distance between the amplification unit board 146, which is a heat source, and the filter heat sink panel 148 is relatively short, the use of the vapor chamber may be preferred. In contrast, in a case where the distance between the amplification unit board 146, which is a heat source, and the filter heat sink panel 148 is relatively long, the use of the heat pipe may be preferred.

The multiplicity of RF filters 140, as illustrated in FIGS. 10 to 12*b* and FIG. 14, may be detachably combined with the female socket 125 provided on the front side of the main board 120 using the male socket 146' formed in the amplification unit board 146. Moreover, the multiplicity of RF filters 140 may be screw-fastened to the front housing 130 through the multiplicity of screw through-holes 142*a* formed in the edge of the rear end portion of the filter body 141, using the fixation screws 142, respectively, thereby being fixed to the front housing 130 in a more stable manner. At this point, the male socket 146' formed in the amplification unit board 146, as illustrated in FIG. 14, passes through the through-slit 135 formed in the front surface of the front housing 130 that corresponds to an external space and then is combined with the female socket 125 in a socket-pin coupling manner. For this reason, as described above, the foreign-material introduction-prevention ring not illustrated may be interposed between the filter body 141 and the front housing 130.

As illustrated in FIGS. 10 to 12*b*, at least one fixation boss 147 for screw-fixing the multiplicity of radiation element modules 160 described below may be installed on the front surface of the filter body 141. At least one fixation boss 147 passes through a boss through-hole 157 formed in the reflector 150 and is exposed to the outside by passing through a front surface of the antenna arrangement unit 151 of the reflector 150. The element fixation screws 180 that fix the multiplicity of radiation element modules 160 are fastened to the fixation bosses 147, respectively.

In this case, at least one fixation boss 147 may be made of a metal material facilitating heat transfer. Therefore, since the filter body 141 and the fixation boss 147, as described above, are made of a metal material facilitating heat transfer, the advantage of limitedly facilitating dissipation of heat generated from the filer body 141 toward the front direction in which the radome is not present is provided. Furthermore, a radiation director 165, one of constituent elements of the radiation element module 160 described below is also made of a metal material facilitating heat transfer. Thus, the performance in heat dissipation in the front direction can be much more improved in terms of a heat dissipation area being expanded in the front direction. The expansion of the heat dissipation area will be described in detail below.

In order to perform beamforming, the multiplicity of radiation element modules 160, as illustrated in FIGS. 2 to 5, are needed as an array antenna. The multiplicity of radiation element modules 160 may generate a narrow directional beam and thus may increase radio wave concentration in a direction designated. In recent years, dipole-type dipole antennas or path-type patch antennas have been most frequently utilized as the multiplicity of radiation element modules 160. The multiplicity of radiation element modules 160 are designed to be spaced apart in such a manner that they, when installed, minimize mutual signal interference therebetween. In the related art, usually, the radome that protects the multiplicity of radiation element modules 160 from the outside are used as an essential constituent element in order that the design for an arrangement of the multiplicity of radiation element modules 160 is not changed due to an external environmental factor. Therefore, the multiplicity of radiation element modules 160 that has a portion covered with the radome and the antenna board 30 on which the multiplicity of radiation element modules 160 are installed are not exposed to outside air. Thus, system heat generated due to operation of the antenna apparatus 100 has to be dissipated to the outside in a significantly limited manner.

The radiation element module 160 of the antenna apparatus 100 according to the third embodiment of the present disclosure, as illustrated in FIGS. 10 to 12*b*, may include a radiation element module cover 161, a radiation-element printed circuit board 162, and the radiation director 165. The radiation element module cover 161 is formed in a manner that extends over a long distance in the upward-downward direction, and is arranged on each of the multiplicity of antenna arrangement units 151 formed in a front surface of the reflector 150. The radiation-element printed circuit board 162 is arranged in a contacted manner on a rear-surface portion of the radiation element module cover 161, but between the radiation element module cover 161 and the antenna arrangement unit 151. An antenna patch circuit unit 163*a* and the electricity supply line 163*b* are print-formed on the radiation-element printed circuit board 162. The radiation director 165 is formed of a conductive metal material and is electrically connected to the antenna patch circuit unit 163*a* on the radiation-element printed circuit board 162.

The above-described antenna patch circuit unit 163*a*, as a dual polarization patch element that generates any one dual polarization of ±45 polarization and vertical/horizontal polarization that are orthogonal to each other may be print-formed on a front surface of the radiation-element printed circuit board 162. Three antenna patch circuit units 163*a* may be print-formed to be spaced apart from each other in the upward-downward direction (the lengthwise direction). The three antenna patch circuit 163*a* may be connected by the electricity supply line 163*b* to each other.

In an antenna apparatus in the related art, a separate electricity line has to be formed on a lower surface of a printed circuit board on which an antenna patch circuit unit is mounted. For this reason, a multiplicity of through-holes are provided and the like. Thus, an electricity supply structure is complicated and occupies a space under the radiation-element printed circuit board 162. A problem occurs in that this structure serves as an obstacle that interrupts direct surface contact for heat transfer between the RF filter 140 and the radiation-element printed circuit board 162. However, the electricity supply line 163*b* according to the third embodiment of the present disclosure, along with the antenna patch circuit unit 163*a*, is formed by being patten-printed on the same front surface of the radiation-element printed circuit board 162 as the antenna patch circuit unit 163*a*. Thus, this pattern-printing has not only the advantage that the electricity supply structure is significantly simplified, but also the advantage that a combination space in which the RF filter 140 is brought into direct surface contact with the radiation-element printed circuit board 162 for heat transfer is secured.

The radiation director 165 is formed of a metal material having a heat transfer property or conductivity and is electrically connected to the antenna patch circuit unit 163*a*. The radiation director 165 may perform a function of guiding a radiation beam toward the front direction and, at the same time, transferring heat generated in back of the radiation-element printed circuit board 162 toward the front direction through heat transfer. The radiation directors 165 may be made of a conductive metal material through which electricity well flows and may be installed in such a manner as to be spaced apart in front of the antenna patch circuit units 163*a*, respectively.

The radiation element that uses the antenna patch circuit unit 163*a* and the radiation director 165 is described according to the third embodiment of the present disclosure. However, in a case where the dipole antenna is used, the radiation director may be omitted as a constituent element. Moreover, the greater height the dipole antenna has, the farther heat is dissipated from a front surface of the reflector 150. Thus, an amount of the dissipated heat can be increased.

With reference to FIGS. 4 and 10 to 12*b*, the radiation director 165 may be electrically connected to the antenna patch circuit unit 163*a* through a director through-hole 164*c*. An overall size, a shape, an installation position, and the like of the radiation director 165 may be suitably designed by experimentally measuring a characteristic of the radiation beam radiated from the antenna patch circuit unit 163*a* or by simulating the characteristic thereof. The radiation director 165 serves to guide the radiation beam generated from the antenna patch circuit unit 163*a* toward the front direction and thus to further reduce a beam width of the entire antenna. A characteristic of a side lobe are also satisfactorily improved. Furthermore, the radiation director 165 may compensate for a loss due to the patch-type antenna. Since the radiation director 165 is made of a conductive metal material, the radiation director 165 may also perform a heat dissipation function. It is desired that the radiation director 165 is formed in such a manner as to have a shape suitable for guiding the radiation beam toward the front direction, for example, a circular shape that enables non-directivity. However, the radiation director 165 is not limited to this shape.

At least two antenna patch circuit unit 163*a* and the radiation director 165 may constitute one radiation element module 160. FIGS. 10 to 12*b* illustrate an example where three antenna patch circuit units 163*a* and the radiation director 165 form the radiation element module 160 as one unit. The number of the antenna patch circuit units 163*a* and the number of the radiation directors 165 may vary according to an optimal design of the radiation element module 160 for increasing a gain. A total of three radiation directors 165 are arranged on each of the RF modules 200 according to the first embodiment of the present disclosure in such a manner as to secure a maximum gain, but the number of the radiation directors 165 is not limited to 3.

The director through-hole 164*c* is formed in the radiation director 165, and the radiation director 165 may be electrically connected to the antenna patch circuit unit 163*a* through the director through-hole 164*c*. More specifically, the radiation director 165 and the antenna patch circuit unit 163*a* may be electrically connected to each other, using as an intermediary the element fixation screw 180 that is provided for fixation to the front surface of the filter body 141.

In this case, the radiation element module cover 161 is formed of a non-conductive plastic material by injection molding. Moreover, as illustrated in FIGS. 12*a* and 12*b*, a director fixation unit 167 that shape-fits on a rear surface of the radiation director 165 may be provided on one surface of the radiation element module cover 161, and a director fixation protrusion 168 that is possibly combined with the radiation director 165 may be formed on the director fixation unit 167 in a manner that protrudes toward the front direction.

In this case, the radiation director 165 may be fixed by at least one director fixation protrusion 168 being pressure-inserted into at least one director fixation groove (to which a reference numeral is not assigned). The at least one director fixation groove is formed in the shape of a recess at a position on the radiation director 165 that corresponds to at least one director fixation protrusion 168.

In addition, at least one board fixation hole 164*a* for combination with the RF filter 140 may be formed in the radiation element module cover 161 by passing therethrough. The element fixation screw 180 passes through the director through-hole 164*c* in the radiator director 165 and the board fixation hole 164*b* in the radiation element module cover 161, and then passes through the board through-hole 164*a* formed in the radiation-element printed circuit board 162. Thus, the element fixation screw 180 may be firmly combined with the antenna arrangement unit 151 on the reflector 150.

In addition, at least one reinforcement rib 166 may be formed on a front surface of the radiation element module cover 161, and thus may form the exterior appearance of the radiation element module cover 161 and may reinforce the radiation element module cover 161 formed of a plastic material in order to increase the strength thereof.

With this configuration, the RF module 200 may directly discharge heat generated in the RF filter 140 in front of the front housing 130 to the outside through contact with a rear surface of the reflector 150 or through the heat dissipation holes 155 formed in the reflector 150.

The antenna RF module assembly 300 according to the second embodiment of the present disclosure may be defined as including the RF module 200 that are implemented as various implementation examples that follow.

As one implementation example, the antenna RF module assembly 300 may include: a multiplicity of RF filters 140 detachably combined with a front surface of a main board 120; a multiplicity of radiation element modules 160 arranged in a stacked manner in front of the multiplicity of RF filters 140, respectively; and a reflector 150 arranged in such a manner as to cover the multiplicity of RF filters 140, serving to ground (GND) the multiplicity of the radiation element modules 160, and, at the same time, acting as an intermediary for dissipating heat generated from the direction of the multiplicity of RF filters 140 to the outside.

As another implementation example, the RF module 200 may include: a multiplicity of RF filters 140 that are arranged to be spaced a predetermined distance apart from each other in the upward-downward direction and the leftward-rightward direction; a multiplicity of radiation element modules 160 arranged in a stacked manner in front of the multiplicity of RF filters 140, respectively; and a reflector 150 arranged in such a manner as to separate the multiplicity of RF filters 140 and the multiplicity of radiation element modules 160 from each other, wherein the multiplicity of RF filters 140 are detachably combined, in a socket-pin coupling manner, with a front surface of a main board 120 that is stacked in an internal space 110S in an antenna housing 105.

As still another implementation example, the RF module 200 may include: a multiplicity of RF filters 140, each having at least four external surfaces; a multiplicity of radiation element modules 160 arranged in a stacked manner in front of any one surface (for example, a front surface) of external surfaces of each of the multiplicity of RF filters 140; an amplification unit board 146 arranged on any other surface of the external surfaces of each of the multiplicity of RF filters 140, at least one analog amplification element being mounted on the amplification unit board 146; and a reflector 150 arranged between the multiplicity of RF filters 140 and the multiplicity of radiation element modules 160 and serving to ground the multiplicity of radiation element modules 160 in a shared manner, wherein heat generated from the at least one analog amplification element is dissipated through one of sidewalls of the multiplicity of RF filters 140 and is dissipated toward the front direction with the reflector 150 as an intermediary.

Lastly, as still another implementation example, the RF module 200 may include; a multiplicity of RF filters 140, each having at least four external surfaces, detachably combined with a front surface of a main board 120; a multiplicity of radiation element modules 160 arranged in a stacked manner in front of any one surface (for example, a front surface) of external surfaces of each of the multiplicity of RF filters 140; and a reflector 150 arranged in such a manner as to cover the multiplicity of RF filters 140, wherein the reflector 150 is formed of a metal material in such a manner as to provide grounding function between the multiplicity of RF filters 140 and the multiplicity of radiation element modules 160 and, at the same time, to reflect an electromagnetic wave emitted from the multiplicity of radiation element modules 160 toward the front direction, and a multiplicity of heat dissipation holes 155 is formed in the reflector 150 in such a manner as to discharge heat generated from the direction of the multiplicity of RF filters toward the front direction or the sideways direction.

Processes of assembling the RF module 200 according to the first embodiment of the present disclosure and the antenna apparatus 100 according to the third embodiment, which are configured as described above, are briefly described with reference to the accompanying drawings (particularly, FIG. 7 and subsequent figures).

First, as illustrated in FIGS. 10 to 12*b*, in an implementation example of a method of assembling the RF module 200 according to the first embodiment of the present disclosure, the amplification unit board 146 on which the analog amplification element is mounted is combined with any one of a first side and a second side of the filter body 140 that is manufactured by die casting. Next, the reflector 150 in which the multiplicity of heat dissipation holes 155 are formed is arranged on the front surface of the RF filter 140, and then, the radiation-element printed circuit board 162 of the radiation element module 160 is arranged on top of the reflector 150. The radiation element module cover 161 of the radiation element module 160 is arranged on top of the radiation-element printed circuit board 162, and then the radiation director 165 of the radiation element module 160 is assembled to the radiation element module cover 161. The RF module 200 is completely assembled by electrically connecting the radiation director 165 and the radiation-element printed circuit board 162. The amplification unit board 146 may be later combined with the front surface of the main board 120 in a socket-pin coupling manner.

In an implementation example of a method of assembling the antenna apparatus 100 according to the third embodiment of the present disclosure, as illustrated in FIGS. 8, 9, and 15, the front housing 130 is fixed to a front end portion of the rear housing 110 by being combined therewith, in such a manner that the internal space 110S in the antenna housing 105 which the main board 120 is installed and the external space are completely separated from each other. Then, the male socket 146' of the amplification unit board 146 of each of the multiplicity of RF modules 200 is combined with the female socket 125 of the main board 120 in a socket-pin coupling manner.

Thereafter, as illustrated in FIG. 16, the reflector 150 is fixed to an end portion of an edge of the rear housing 110 using a screw, and then, when each of the multiplicity of radiation element modules 160 is combined with the antenna arrangement unit 151, the antenna apparatus 100 is completely assembled.

In this manner, in the antenna apparatus 100 according to the third embodiment of the present disclosure, the system heat inside the antenna apparatus 100 may be easily discharged toward all directions including the rear direction and the front direction, as much as an area exposed to outside air due to the omission of the radome. The radiation element module 160 is arranged in such a manner as to be exposed to outside air with the reflector 150 as an intermediary. Thus, it is possible that the heat is dissipated in a distributed manner toward the front and rear directions of the antenna apparatus 100. The effect of improving the performance in heat dissipation much more than in the related art can be achieved.

In addition, a distance of protrusion toward the front direction can be reduced as much as volume is occupied by the radome in the related art. Moreover, a length in the forward-backward direction of each of the multiple of rear heat dissipation pins 111 integrally formed on a rear surface of the rear housing 130 can be reduced as much as heat can be dissipated toward the front direction. Therefore, the overall thickness in the forward-backward direction of the antenna apparatus 100 can be designed for thinning. Accordingly, the advantage of easily installing the antenna apparatus 100 on an inside or outside wall of a building in a wall-mounted manner can be achieved.

The reflector 150 described with reference to FIGS. 1 to 16 constitutes the RF module assembly 300. However, in an implementation example, the reflector 150 is assumed to be provided in a single form that covers all front surfaces of the multiplicity of RF modules 200, and the desired RF module 200 that is selected from among the multiple of RF modules 200 is assumed to be separated from the single reflector 150.

However, in a case where the reflector 150 is provided in a single form, the RF filter 140 of the individual RF module 200 is fixedly installed on the front surface of the main board 120, then the reflector 150 in a single form is assembled, and lastly the radiation element module 160 is assembled to the front surface of the reflector 150. Moreover, the reflector 150 in a single form first has to be necessarily separated before the RF module 200 is individually separated and replaced. A complex structure design is required to be changed to solve these problems.

In order to solve the problems, there is disclosed a reflector 150, as a modification example, that is used in the RF module assembly 300 according to the second embodiment of the present disclosure and the antenna apparatus 100 according to the third embodiment disclosure that includes the RF module assemble.

Figure 17:
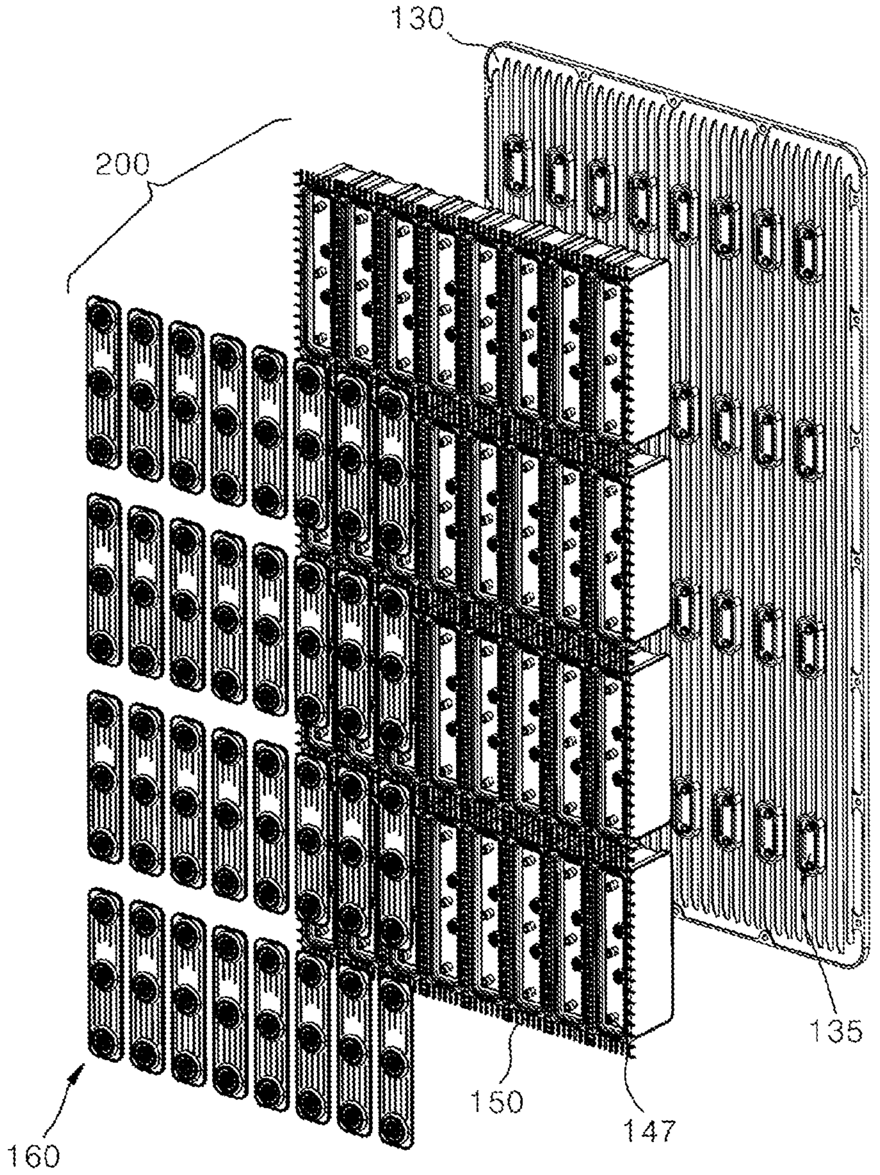
FIG. 17 is an exploded perspective view illustrating a reflector as a modification example, which is one of the constituent elements in FIG. 3.
Figure 18:
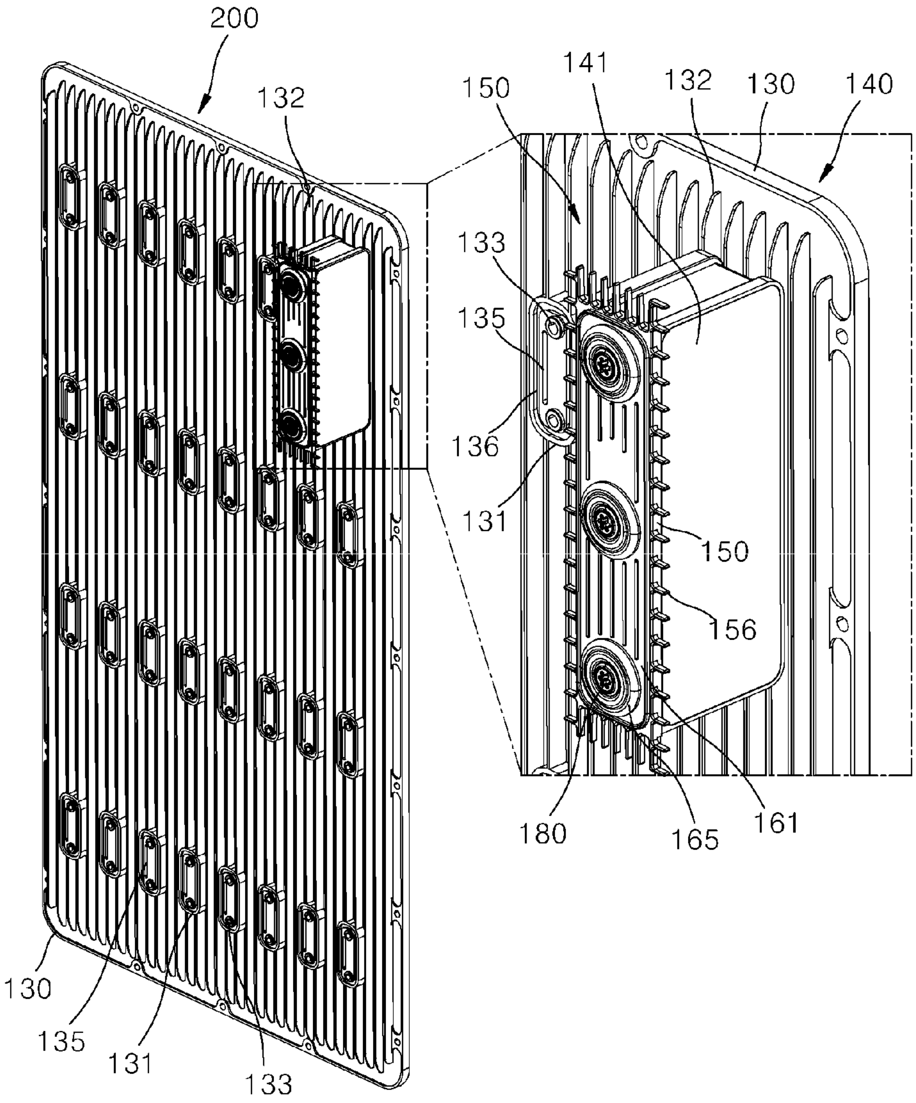
FIG. 18 is a perspective view illustrating a state where the RF module is combined with a front housing, one of the constituent elements in FIG. 17, and an enlarged view illustrating a portion of the perspective view.
Figure 19A:
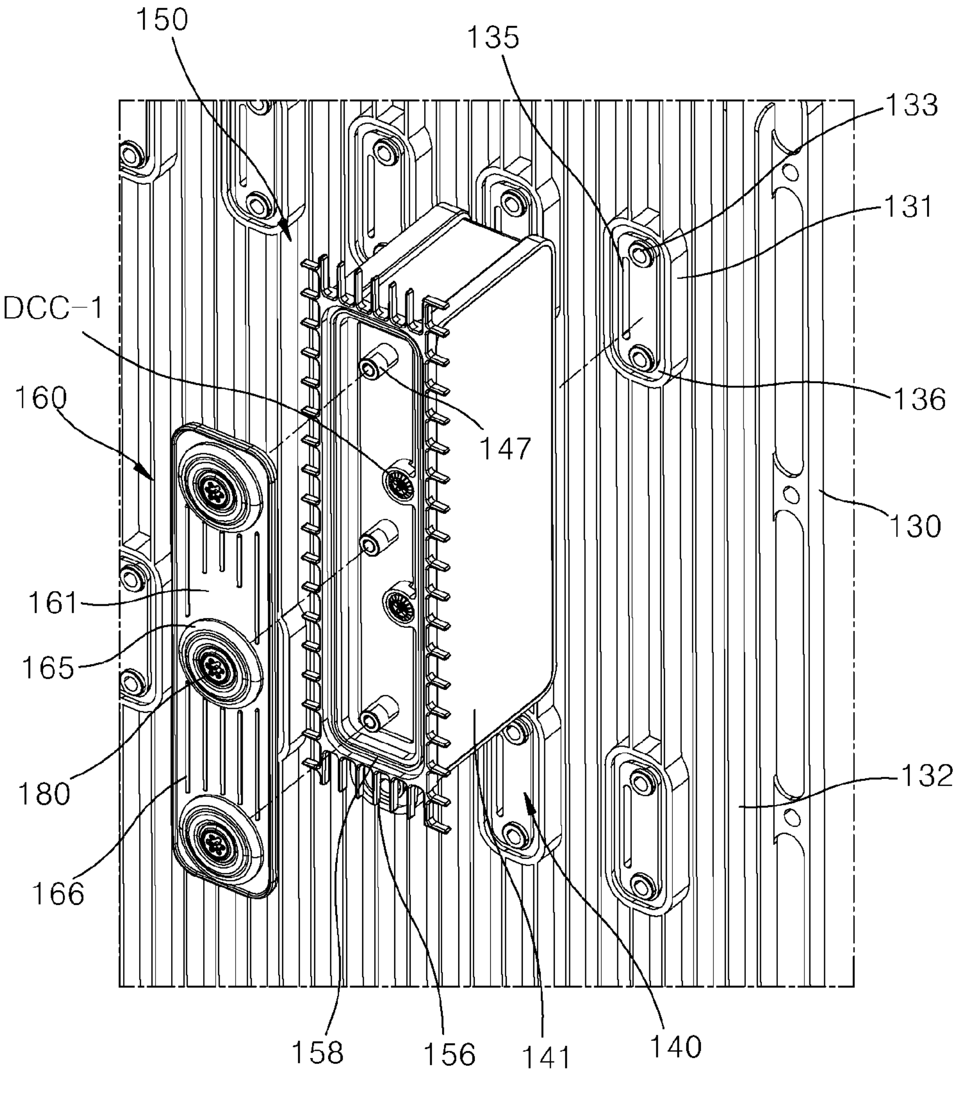
FIG. 19*a* is an exploded perspective view illustrating a front portion of FIG. 18.
Figure 19B:
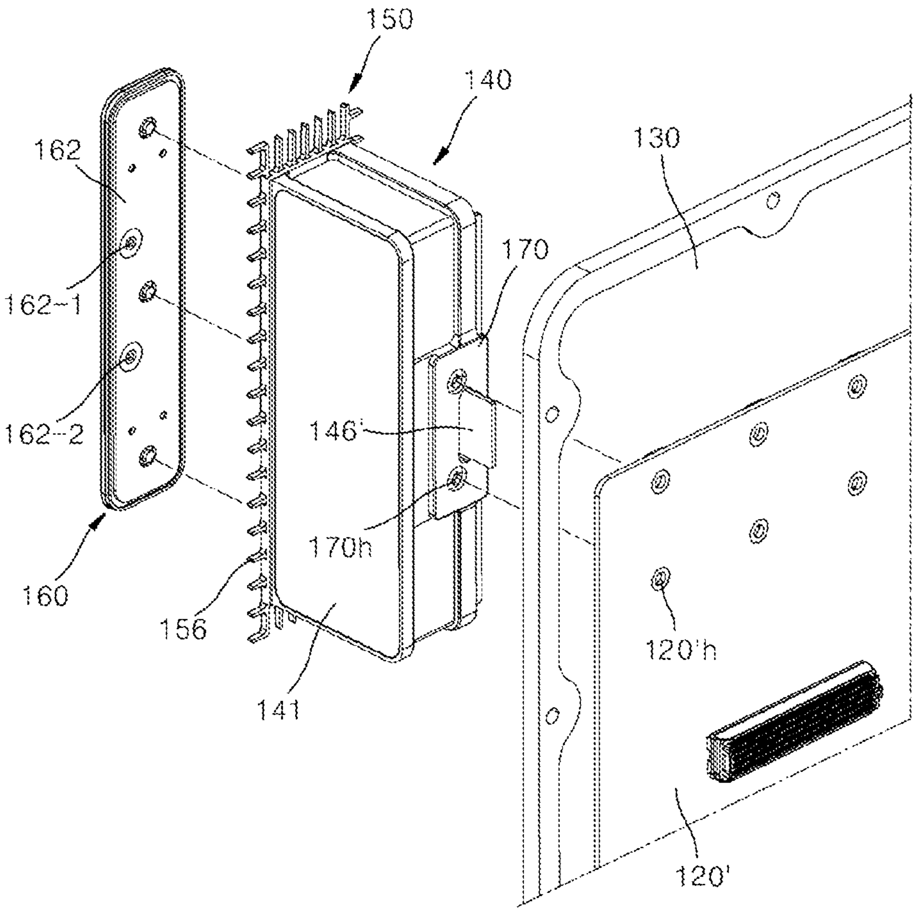
FIG. 19*b* is an exploded perspective views illustrating a rear portion of FIG. 18.
Figure 20:
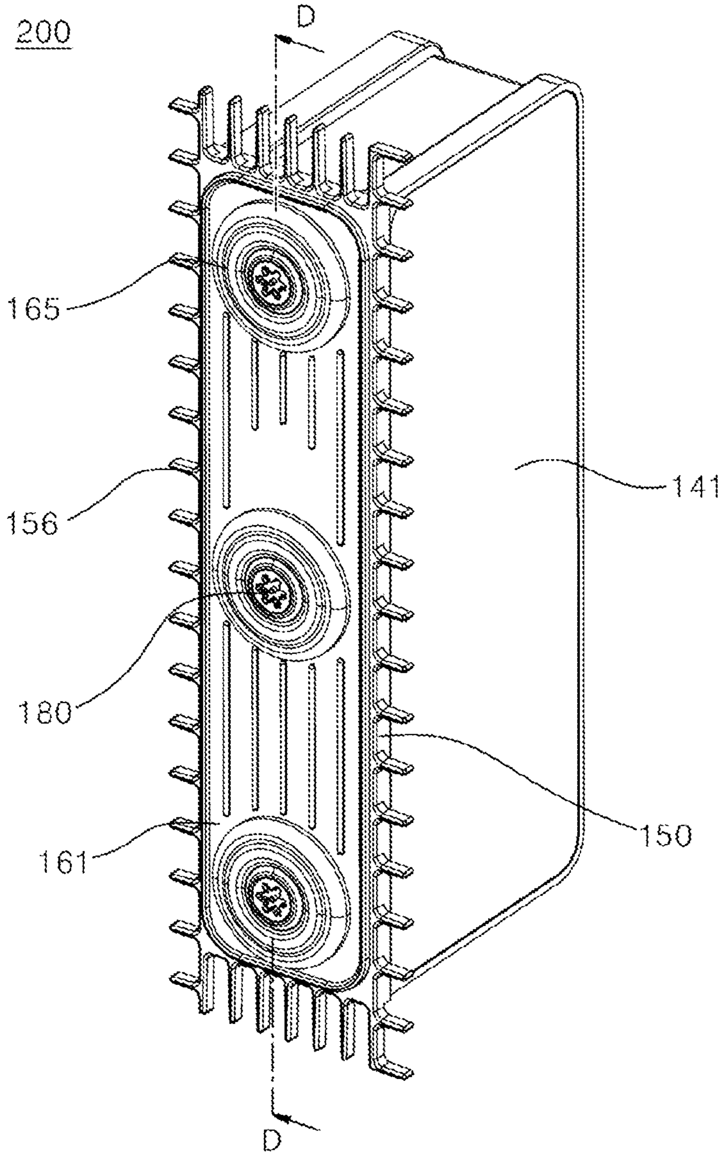
FIG. 20 is a perspective view illustrating an RF module assembly, one of the constituent elements in FIG. 17.
Figure 21A:
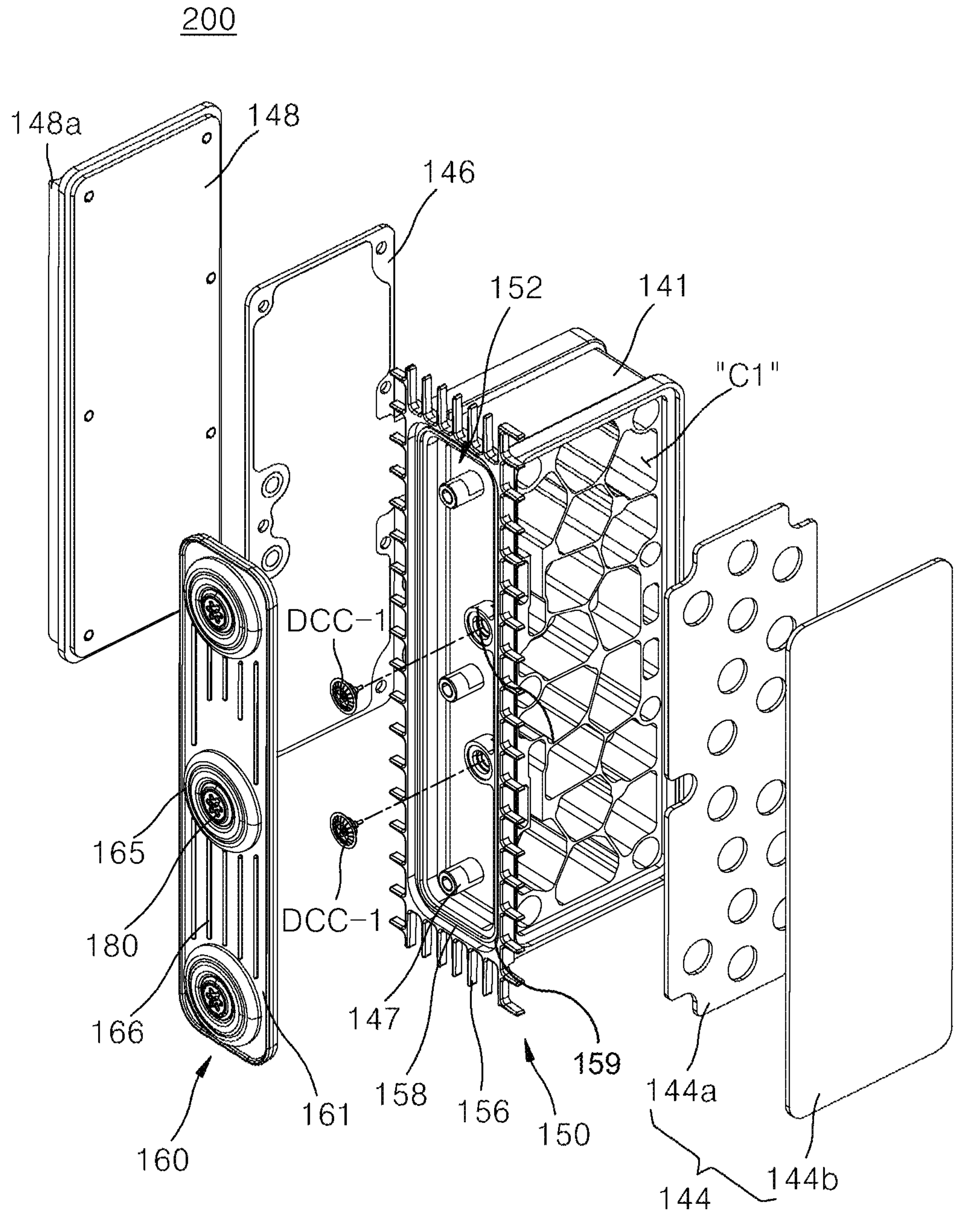
FIGS. 21*a* and 21*b* are exploded perspective views each illustrating the RF module assembly in FIG. 18.
Figure 21B:
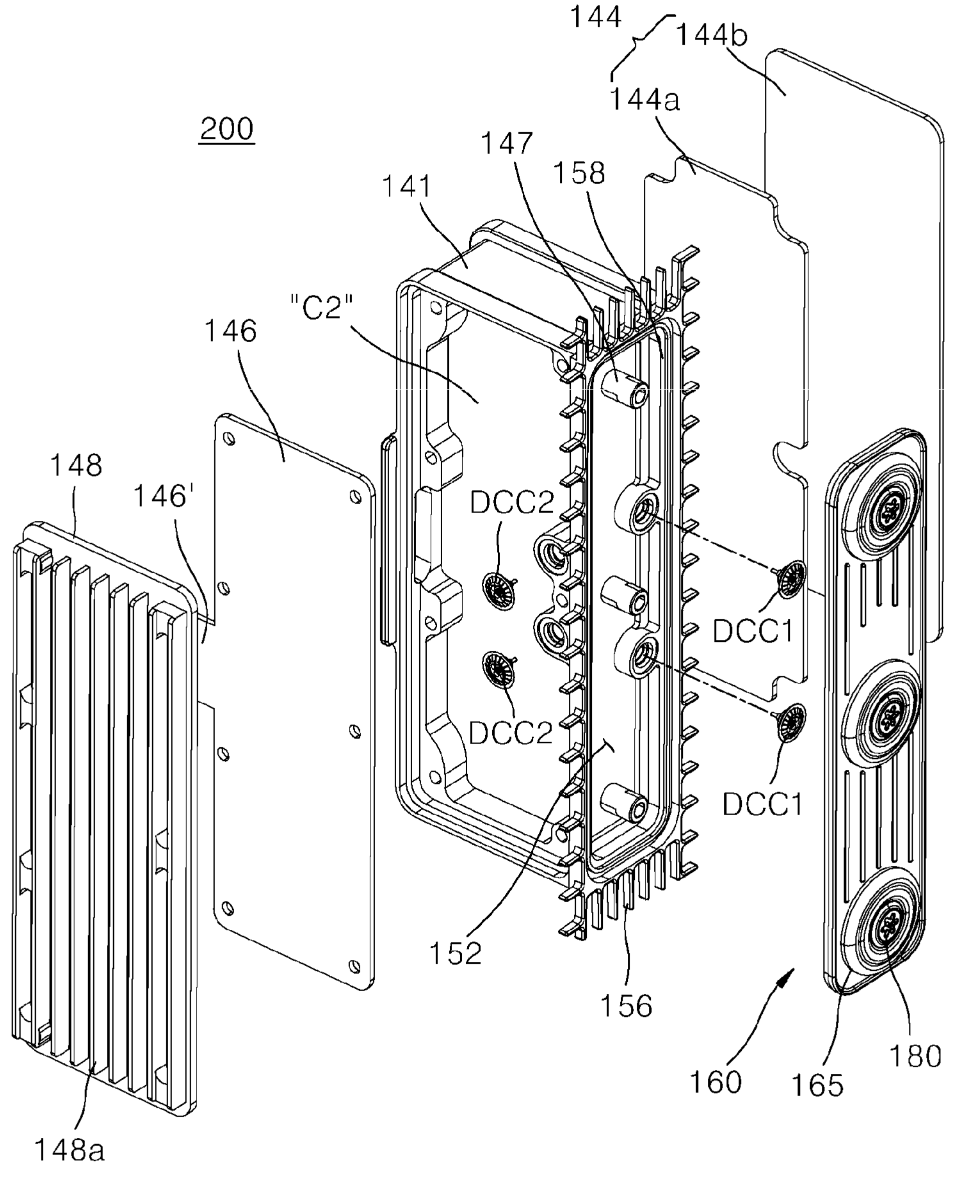
Figure 22:
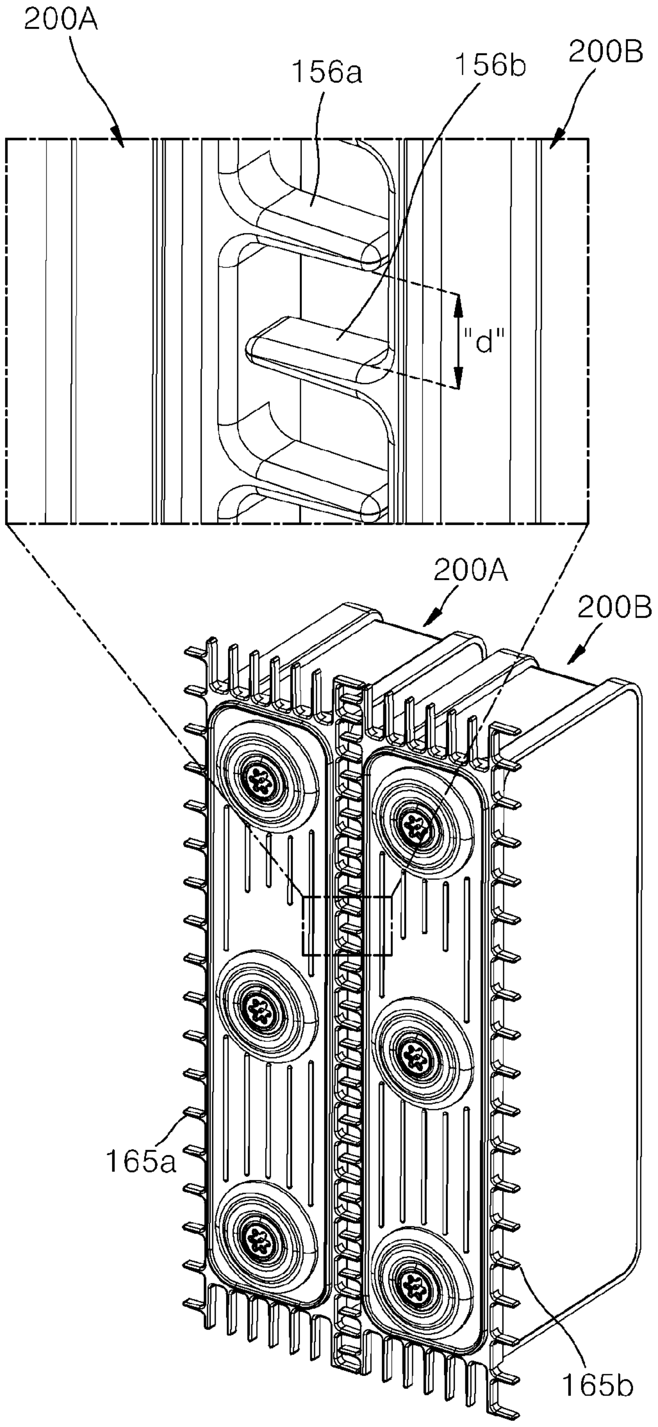
FIG. 22 is a perspective view that is referred to for description of an arrangement relationship among a multiplicity of grill pins, ones of the constituent elements of the reflector.
Figure 23:
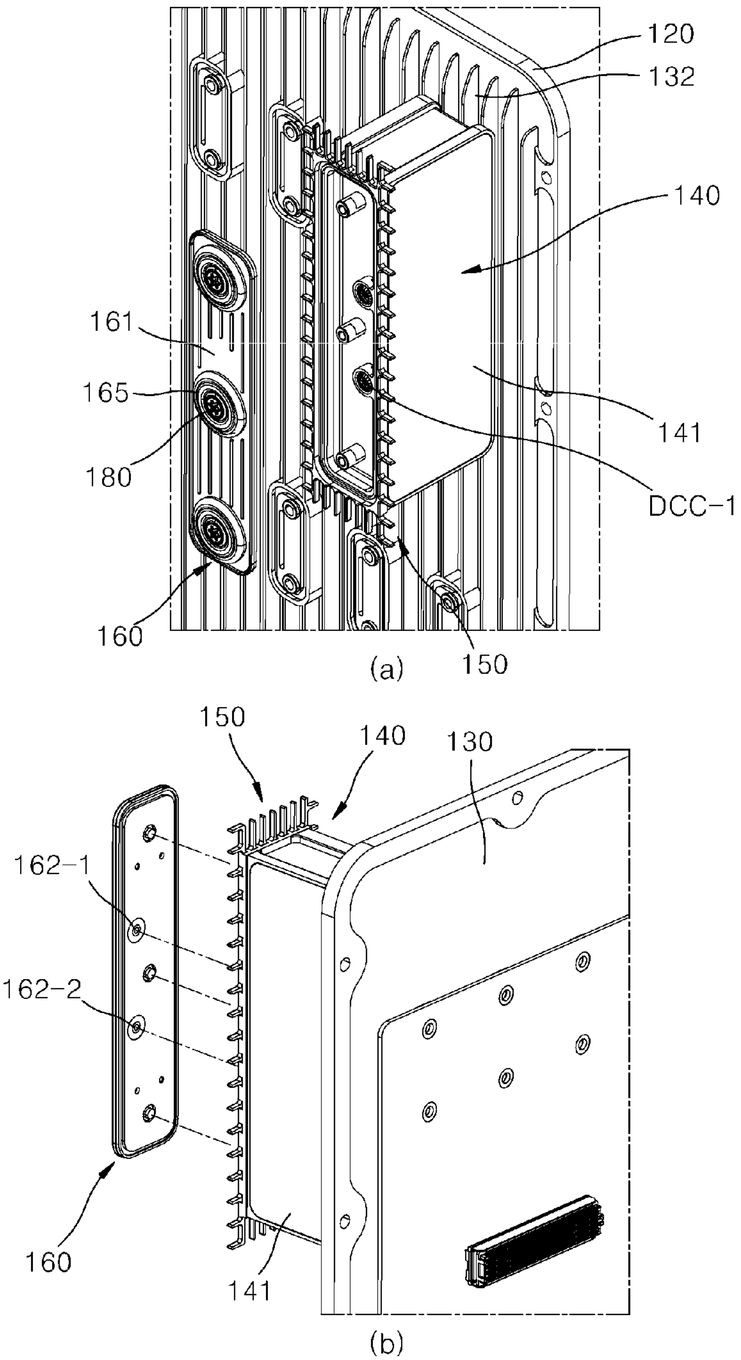
FIG. 23 is exploded perspective views illustrating a relational combination of the radiation element module with an RF filter, when viewed from front and when viewed from rear, respectively.
Figure 24:
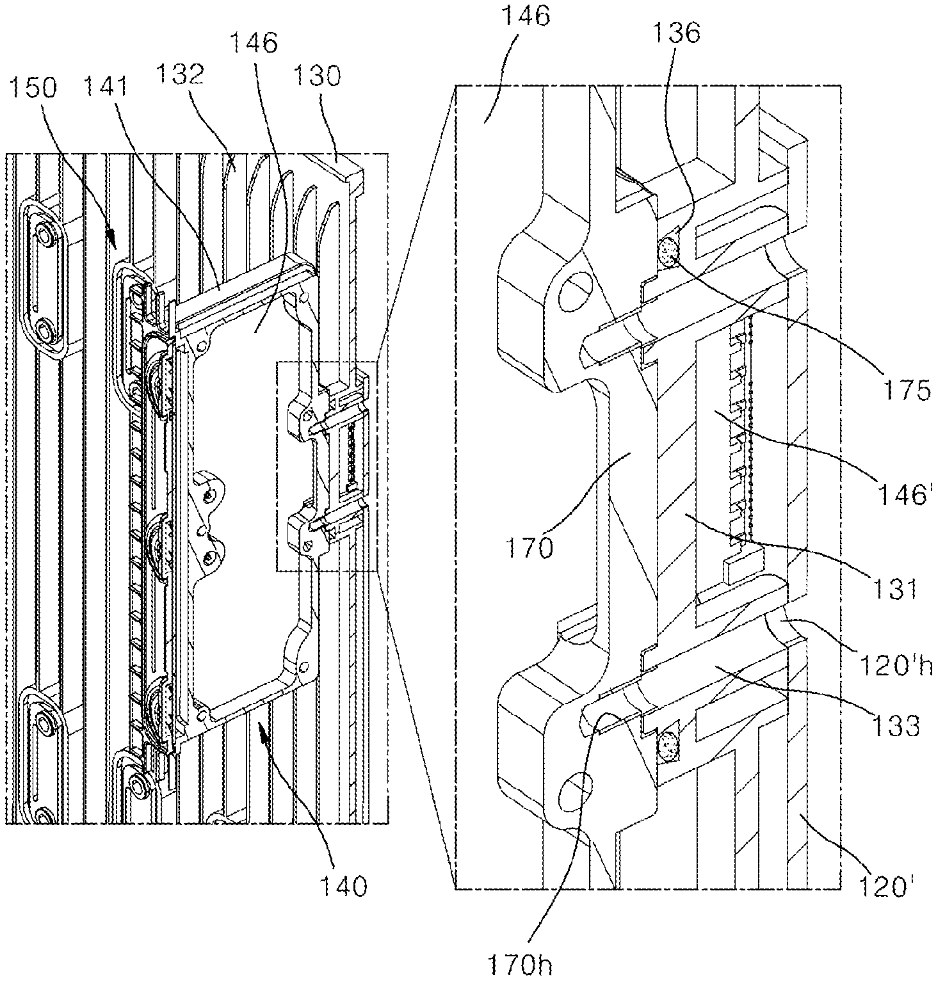
FIG. 24 is a partial cut-away perspective view that is referred to for description of a relational combination of the RF module assembly with a front surface of the front housing, one of the constituent elements in FIG. 17, and an enlarged view of the cut-away perspective view.
Figure 25:
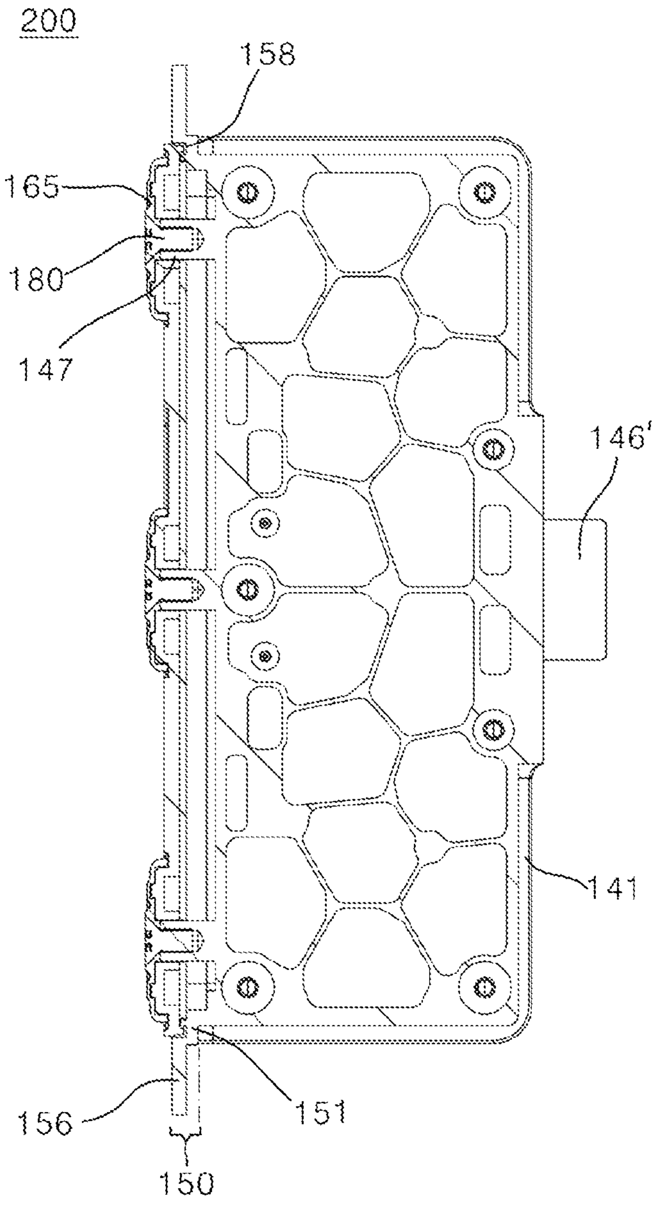
FIG. 25 is a cross-sectional view taken along line D-D on FIG. 20.
Figure 26:
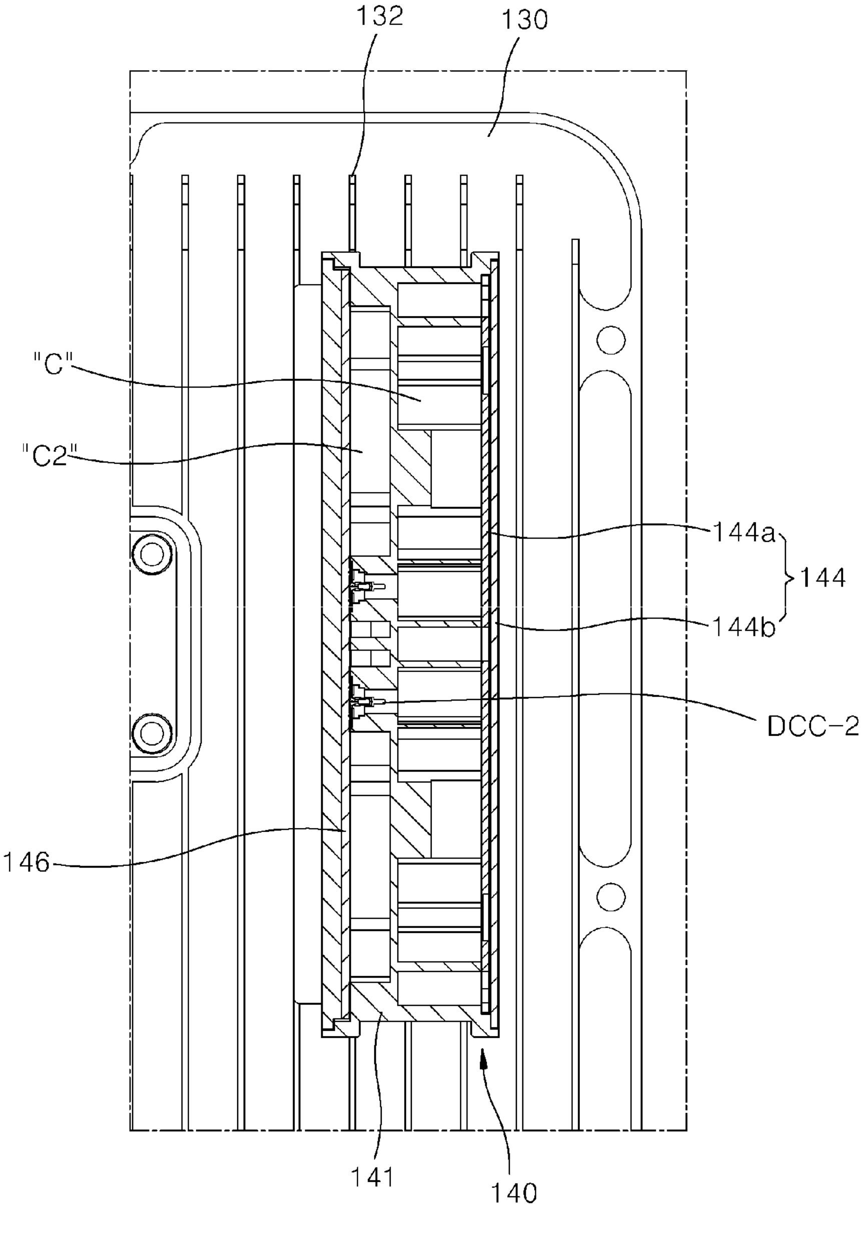
FIG. 26 is a horizontal cross-sectional view illustrating an electrical connectional relationship between the RF filter and the amplification unit board, ones of the constituent elements in FIG. 17.

FIG. 17 is an exploded perspective view illustrating the reflector 150, as a modification example, which is one of the constituent elements in FIG. 3. FIG. 18 is a perspective view illustrating a state where the RF module 200 is combined with the front housing 130, one of the constituent elements in FIG. 17, and an enlarged view illustrating a portion of the perspective view. FIG. 19*a* is an exploded perspective view illustrating a front portion of FIG. 18. FIG. 19*b* is an exploded perspective view illustrating a rear portion of FIG. 18. FIG. 20 is a perspective view illustrating the RF module assembly 300, one of the constituent elements in FIG. 17. FIGS. 21*a* and 21*b* are exploded perspective views each illustrating the RF module assembly 300 in FIG. 18. FIG. 22 is a perspective view that is referred to for description of an arrangement relationship among a multiplicity of grill pins 156, ones of the constituent elements of the reflector 150. FIG. 23 is exploded perspective views illustrating a relational combination of the radiation element module 160 with the RF filter 140, when viewed from front and when viewed from rear, respectively. FIG. 24 is a partial cut-away perspective view that is referred to for description of a relational combination of the RF module assembly 300 with the front surface of the front housing 130, one of the constituent elements in FIG. 17, and an enlarged view of the cut-away perspective view. FIG. 25 is a cross-sectional view taken along line D-D on FIG. 20. FIG. 26 is a horizontal cross-sectional view illustrating an electrical connectional relationship between the RF filter 140 and the amplification unit board 146, ones of the constituent elements in FIG. 17.

As illustrated in FIGS. 17 to 26, the RF filter 140 is arranged on the front surface of the main board 120, and the radiation element module 160 is arranged to one side of the RF filter 140. The reflector 150, as a modification example, of the RF module 200 according to the second embodiment of the present disclosure is arranged between the RF filter 140 and the radiation element module 160 and serves as an intermediary that grounds (GND) the radiation element module 160 and serves to dissipate heat generated in the RF filter 140 to the outside.

The reflector 150 here may be integrally formed on the RF filter 140.

That is, the RF filter 140, as described above, is manufactured of a metal material for molding, using a die-casting molding technique, and the reflector 150 is also formed of a metal material, considering a function thereof. In this respect, the RF filter 140 and the reflector 150 may be manufactured into one piece of the same metal material for molding using the same die-casting molding technique as used in a method of manufacturing the RF filter 140.

As illustrated in FIGS. 21*a* and 21*b*, the reflector 150, as a modification example, may include a blocking rib 159 and a multiplicity of grill pins 156. The blocking rib 159 is formed on the front surface of the RF filter 140 in a manner that protrudes toward the front direction so that an edge end portion, other than a front surface, of the radiation element module 160 is accommodated in the block rib 159. The multiplicity of grill pins 156 are formed on an end portion of the block rib 159 in such a manner as to protrude outward therefrom.

More specifically, the multiplicity of grill pins 156 may be formed along an edge of the blocking rib 159 in such a manner as to be spaced a predetermined distance apart and in such a manner as to extend over a predetermined distance in an outward direction perpendicular to a surface of the blocking rib 159.

In this case, some of the multiplicity of grill pins 156 may be formed to extend in such a manner as to overlap the multiplicity of grill pins 156, respectively, of the reflector 150 adjacent in the leftward-rightward direction. At this point, only the grill pins 156 that are formed to extend in the leftward-rightward direction from an end portion in the width direction of the filter body 141 may overlap the reflector 150 adjacent.

In addition, some of the multiplicity of grill pins 156 may be formed to extend in such a manner as to be positioned in the upward-downward direction in a straight line with the multiplicity of grill pins 156, respectively, of the reflector 150 adjacent in the upward-downward direction. At this point, only the grill pins 156 that are formed to extend in the upward or downward direction from an upper end portion or a lower end portion, respectively, of the filter body 141 may be positioned in the upward-downward direction in a straight line with the reflector 150 adjacent.

In this manner, the multiplicity of grill pins 156 may be arranged to overlap the grip pins 156, respectively, formed on the reflector 150 of the RF filter 140 adjacent in the leftward-rightward direction or may be closely arranged to be in the upward-downward direction in a straight line with the grill pins 156, respectively, formed on the reflector 150 of the RF filter 140 adjacent in the upward-downward direction. Thus, a foreign material may be prevented from being introduced from the outside toward the RF filter 140. Moreover, the reflector 150 has a ventilation structure in which a separation space, serving as the heat dissipation hole 155, is formed between each of the multiplicity of grill pins 156. Thus, heat generated from the direction of the RF filter 140 may be easily dissipated to the outside.

At this point, in a case where, as illustrated in FIG. 22, the radiation element module 160 is arranged to be spaced a gap of half a wavelength apart from the radiation element module adjacent, it is desired that a separation distance d between each of the multiplicity of grill pins 156 is set to have $1/10$ to $1/20$ of a gap between each of the radiation element modules 160. The reason for this is to maximize the capacity of the reflector 150 to dissipate heat while sufficiently keeping the reflector 150 performing the grounding (GND) function and serving as the reflective layer.

A seating end portion 158 in which an edge end portion of the radiation element module 160 is seated may be formed, in the shape of a groove, in an internal surface of the blocking rib 159. The seating end portion 158 may be formed, in a stepped manner, in an internal edge portion of an antenna arrangement unit 152 formed on a front-end surface of the filter body 141 in which the radiation element module 160 is seated. As illustrated in FIGS. 19*a* and 21*a*, a portion of a rear surface of the radiation element module 160 may be fixed to the seating end portion 158 by being seated thereon. The radiation element module 160 is fixed in the same way as in a process of assembling the radiation element module 160 other than the reflector 150 in a single form, among the constituent elements of the RF module 200 according to the second embodiment of the present disclosure that are described with reference to FIGS. 1 to 16.

An internal edge portion of the seating end portion 158 here is formed in the form of a "L"-shaped groove in such a manner as to be open at the front end. A waterproof ring (not illustrated) that is elastically compressed by an edge portion of the radiation element module 160 may be inserted into the internal edge portion of the seating end portion 158. Therefore, a coupling force is provided when the radiation element module 160 is combined with the antenna arrangement unit 152 formed on the front-end surface of the filter body 141. With this coupling force, the waterproof ring is compressed. Thus, a foreign material, such as rainwater, may be prevented from being introduced from the outside into an internal space formed by the antenna arrangement unit 152.

The filter body 141 of the RF filter 140 and the radiation element module 160, as illustrated in FIGS. 19*a* and 19*b*, may be electrically connected to each other with at least one first coaxial connector DCC-1 in between. At least one the first coaxial connector DCC-1 here may be provided on the antenna arrangement unit 152 formed on the front surface of the filter body 141 in such a manner that the radiation element module 160 is seated.

More specifically, two first coaxial connectors DCC-1 that correspond to input and output connectors, respectively, are provided on the antenna arrangement unit 152 of the filter body 141 in such a manner as to be electrically connected to the amplification unit board 146 arranged in the space C1 in the filter body 141. Contact units 162-1 and 162-2 with which terminals of the first coaxial connects DCC-1, respectively, are brought into contact are formed on a rear surface of the radiation-element printed circuit board 162, one of the constituent elements of the radiation element module 160. Thus, the radiation director 165 and the amplification unit board 146 may be electrically connected to each other.

In addition, the multiplicity of resonators DR in the space C2 in which the multiplicity of cavities C are formed, among the spaces C1 and C2 in the filter body 141, and the amplification unit board 146 may be electrically connected to each other with at least one second coaxial connector DCC-2 in between. Frequency filtering is performed through the multiplicity of resonators DR provided in the multiplicity of cavities C, respectively. For this reason, one of the second coaxial connectors DCC-2 may function as an input port (or an input terminal), and the other one of the second coaxial connectors DCC-2 may function as an output port (or an output terminal). At this point, at least one second coaxial connector DCC-2 may be arranged in the predetermined space C2 formed in a lateral portion of the filter body 141 in such a manner that the amplification unit board 146 is arranged. It is desired that at least one second coaxial connector DCC-2 is provided in a manner that passes through the space C1 in one side of the filter body 141 and the space C2 in the other side thereof.

As illustrated in FIGS. 19*a* and 21*a*, a front-housing heat transfer pin 132 and a slit-combination end portion 131 may be provided on the front surface of the front housing 130 with which the filter body 141 with which the radiation element module 160 is combined is combined. The front-housing heat transfer pin 132 increases a surface area of the front surface of the front housing 130 in such a manner as to easily dissipate toward the front direction a portion of heat present in the internal space 110S that is a space between the rear housing 110 and the front housing 130. The through-slit 135 through which the male socket 146' of the amplification unit board 146 passes is formed in the slit-combination end portion 131.

Most of the heat present in the internal space 110S between the rear housing 110 and the front housing 130 is generated from the main board 120 adhesively installed in a contacted manner in the internal space 110S and is dissipated toward the rear direction through the multiplicity of rear heat dissipation pins 111 integrally formed on the rear surface of the rear housing 110. Thus, there is a low need to form the separate front-housing heat transfer pin 132 on the front surface of the front housing 130.

However, RFIC elements, which are among the multiplicity of elements from which heat is generated and which are mounted in a dispersed manner on the front and rear surfaces of one main board 120, are separated and then are mounted on a front surface of an RFIC board 120' that is provided in such a manner as to be stacked on the front surface of the main board 120. Thereafter, in a case where the RFIC elements are brought into surface contact with the rear surface of the front housing 130 for heat transfer, there is a high need to include the front-housing heat transfer pin 132 in order to effectively dissipate the heat generated from the RFIC elements toward the front direction.

The slit-combination end portion 131, as illustrated in FIGS. 19*a* and 24, may be formed in such a manner that a front end portion thereof protrudes toward the front direction over a distance that is equal to or greater than a height of a front end portion of the front-housing heat transfer pin 132. In addition, at least one filter fixation screw hole 133 may be formed on a front-surface portion of the slit-combination end portion 131 in a manner that passes through the front housing 130 in the forward-backward direction.

As illustrated in FIGS. 19*b* and 24, a pressing portion 170 may be formed on a rear-surface portion of the filter body 141 in such a manner that the pressing portion 170 is brought into close with the front surface of the slit-combination end portion 131 and that the male socket 146' of the amplification unit board 146 is exposed. A filter fixation fastening hole 170*h* to which a filter fixation screw (not illustrated) is fastened may be formed in the pressing portion 170 in such a manner as to correspond to a position of the above-described filter fixation screw hole 133.

At this point, a filter fixation through-hole 120'*h*, as illustrated in FIGS. 19*b* and 24, may be formed in the RFIC board 120' in such a manner that the filter fixation screw is screwed, from behind the RFIC board 120', into the filter fixation through-hole 120'*h* for fastening.

As illustrated in FIGS. 19*a* and 24, a socket waterproof groove 136 that has a cross section in the shape of a trapezoid and that is open at the front end may be formed in an internal edge portion of the slit-combination end portion 131, and a socket waterproof ring 175 of an elastic material may be inserted into the socket waterproof groove 136.

When the filter body 141 is combined with the main board 120 with the front housing 130 in between, a coupling force with which the filter fixation screw is fastened brings the pressing unit 170 into close contact with the slit-combination end portion 131, thereby elastically transforming the pressing unit 170. Thus, the socket waterproof ring 175 may perform a waterproofing function.

Therefore, although the front surface of the front housing 130 is exposed to outside air in front, a foreign material, such as rainwater, may be prevented from being introduced through the through-slit 135 in the front housing 130.

It is possible that each of the RF modules 200 according to the second embodiment of the prevent disclosure, which is configured as described above, is fixed to the main board 120 or separated therefrom. Thus, the advantage of greatly improving the ease with which the RF module 200 is assembled is provided. In addition, heat that is generated from the direction of the RF module 200 is easily dissipated to the outside through the multiplicity of grill pins 156 in the reflector 150. Thus, the advantage of further improving a dissipation function is provided.

The various implementation examples of the antenna RF module, the RF module assembly including the antenna RF modules, and the antenna apparatus including the RF module assembly according to the present disclosure are in detail described above with reference to the accompanying drawings. The embodiments of the present disclosure are not necessarily limited to the above-described implementation examples. It is to be naturally expected that various modifications may be possibly made to the embodiments within the scope of the present disclosure or within an equivalent thereof by a person of ordinary skill in the art to which the present disclosure pertains. Therefore, the proper scope of the present disclosure should be defined by the following claims.

INDUSTRIAL APPLICABILITY

According to the present disclosure, there are provided an antenna RF module capable of being arranged outside an antenna housing without the presence of a radome in such a manner as to be exposed to outside air and thus of dissipating heat in a distributed manner in the front and rear directions of the antenna housing and an antenna apparatus including the antenna RF module. The antenna RF module and the antenna apparatus including the antenna RF modules are capable of greatly improving the performance in heat dissipation.

The invention claimed is:

1. An antenna radio-frequency (RF) module comprising:

an RF filter arranged on a front surface of a main board;

a radiation element module arranged on a first side of the RF filter; and a reflector integrally formed on the RF filter and arranged between the RF filter and the radiation element module in such a manner as to ground (GND) the radiation element module and, at the same time, to serve as an intermediary for dissipating heat generated in the RF filter to the outside, wherein the reflector comprises a plurality of heat-dissipation holes penetrating through the reflector to form an airflow path between the RF filter and the radiation element module, wherein the antenna RF module further comprises an amplification unit board arranged in any one of predetermined spaces formed in a first side and a second side, respectively, in a width direction of a filter body of the RF filter, and electrically connected to the main board by being combined therewith in a socket-pin coupling manner, wherein the filter body and the radiation element module are electrically connected to each other with at least one first coaxial connector in between, wherein the at least one first coaxial connector is provided on an antenna arrangement unit that is formed on a front surface of the filter body in such a manner that the radiation element module is seated on the antenna arrangement unit.

2. The antenna RF module of claim 1, wherein the RF filter and the reflector are manufactured into one piece of a metal material using a die-casting molding technique.

3. The antenna RF module of claim 1, wherein the reflector comprises:

a blocking rib formed on a front surface of the RF filter in a manner that protrudes toward a front direction so that an edge end portion, other than a front surface, of the radiation element module is accommodated in the blocking rib.

4. The antenna RF module of claim 3, wherein the reflector further comprises:

a multiplicity of grill pins that protrude outward from an end portion of the blocking rib, and wherein some of the multiplicity of grill pins are formed to extend in such a manner as to overlap a multiplicity of grill pins, respectively, of a reflector adjacent in a leftward-rightward direction.

5. The antenna RF module of claim 3, wherein the reflector further comprises:

a multiplicity of grill pins formed in such a manner as to protrude outward from an end portion of the blocking rib, and wherein some of the multiplicity of grill pins are formed to extend in an upward-downward direction in a straight line with a multiplicity of grill pins, respectively, of a reflector adjacent in the upward-downward direction.

6. The antenna RF module of claim 4, wherein the radiation element module is arranged to be spaced a gap of half a wavelength from a radiation element module adjacent, and a separation distance between each of the multiplicity of grill pins is set to have $1/10$ to $1/20$ of the gap between each of the radiation element modules.

7. The antenna RF module of claim 3, wherein a seating end portion in which an edge end portion of the radiation element module is seated is formed in an internal surface of the blocking rib of the reflector.

8. The antenna RF module of claim 1, wherein the RF filter comprises:

a filter heat sink panel dissipating heat generated from the amplification unit board from any one of the predetermined spaces to outside the filter body.

9. The antenna RF module of claim 8, wherein the filter heat sink panel closes an open space in the filter body and, at the same time, is brought into surface contact with the amplification unit board for heat transfer so that the heat generated from the amplification unit board is dissipated through filter heat sink pins integrally formed on an external surface of the filter heat sink panel.

10. The antenna RF module of claim 8, wherein at least one male socket that is combined, in a socket-pin coupling manner, with the main board, is provided on the amplification unit board.

11. The antenna RF module of claim 1, wherein at least one of a power amplifier (PA) element and a low-noise amplifier (LNA) element is mounted, as an analog amplification element, on the amplification unit board.

12. The antenna RF module of claim 1, wherein a multiplicity of resonators in a space in the filter body, a multiplicity of cavities being formed in the space, and the amplification unit board are electrically connected to each other with at least one second coaxial connector in between.

13. The antenna RF module of claim 12, wherein the at least one second coaxial connector is provided in the predetermined space that is formed in a lateral portion of the filter body.

14. The antenna RF module of claim 1, wherein the antenna RF module is not covered by a radome, and exposed to outside air.

* * * * *